(12) United States Patent
Choi et al.

(10) Patent No.: US 11,508,010 B2
(45) Date of Patent: Nov. 22, 2022

(54) AUTOMATIC ASSIGNMENT OF LOCATIONS TO MOBILE UNITS VIA A BACK-END APPLICATION COMPUTER SERVER

(71) Applicant: Hartford Fire Insurance Company, Hartford, CT (US)

(72) Inventors: Fred Y Choi, Unionville, CT (US); Robert W. Proctor, Simsbury, CT (US); Kim A. Root, East Haddam, CT (US); Vikas Sachdeva, Shrewsbury, MA (US); Vivek Nigam, Cheshire, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 750 days.

(21) Appl. No.: 15/174,441

(22) Filed: Jun. 6, 2016

(65) Prior Publication Data

US 2017/0352103 A1    Dec. 7, 2017

(51) Int. Cl.
*G06Q 40/08* (2012.01)
*H04W 4/021* (2018.01)
*H04W 4/12* (2009.01)
*H04W 8/26* (2009.01)
*G06F 3/04817* (2022.01)
*G06F 3/0482* (2013.01)
*H04W 4/029* (2018.01)

(52) U.S. Cl.
CPC ........... *G06Q 40/08* (2013.01); *G06F 3/0482* (2013.01); *G06F 3/04817* (2013.01); *H04W 4/021* (2013.01); *H04W 4/029* (2018.02); *H04W 4/12* (2013.01); *H04W 8/26* (2013.01)

(58) Field of Classification Search
CPC ........................................ G06Q 40/08
USPC ............................................. 705/4
See application file for complete search history.

(56) References Cited

U.S. PATENT DOCUMENTS 8,612,276 B1 * 12/2013 Nielsen .......... G06Q 10/063118
                                              705/7.16
8,930,458 B2    1/2015 Lewis
9,282,430 B1 *  3/2016 Brandmaier ............ H04W 4/90
(Continued)

*Primary Examiner* — Jessica Lemieux
(74) *Attorney, Agent, or Firm* — Buckley, Maschoff & Talwalkar LLC

(57) ABSTRACT

A back-end application computer server may access a location data store containing information about a set of locations to be visited, including location identifiers and location coordinates. The computer server may then prioritize the locations to be visited. A mobile unit data store may contain information about a set of mobile units, including mobile unit identifiers, mobile unit location coordinates, and mobile unit communication addresses. The computer server may then automatically assign each location to a mobile unit based on the location coordinates, the mobile unit location coordinates, at least one geo-fence, and said prioritization. Indications of assigned locations may be transmitted to each mobile unit via the associated mobile unit communication address, and electronic messages may be exchanged to support an interactive user interface display associated with assignments of locations to mobile units. According to some embodiments, the back-end computer server facilitates collection of location information from mobile devices.

13 Claims, 21 Drawing Sheets

(56) References Cited

U.S. PATENT DOCUMENTS

| | | | |
|---|---|---|---|
| 2002/0035488 A1* | 3/2002 | Aquila | G06Q 40/02 |
| | | | 705/4 |
| 2009/0326991 A1* | 12/2009 | Wei | G06Q 10/02 |
| | | | 705/5 |
| 2010/0191701 A1 | 7/2010 | Beyda et al. | |
| 2015/0248730 A1* | 9/2015 | Pilot | G06Q 10/0633 |
| | | | 705/4 |
| 2016/0034961 A1 | 2/2016 | May et al. | |
| 2016/0048795 A1 | 2/2016 | Walton | |
| 2016/0071216 A1* | 3/2016 | Florence | G06Q 40/08 |
| | | | 705/4 |
| 2016/0189310 A1* | 6/2016 | O'Kane | G06Q 40/08 |
| | | | 705/4 |
| 2016/0203443 A1* | 7/2016 | Wheeling | G06Q 10/1095 |
| | | | 705/4 |
| 2016/0275638 A1* | 9/2016 | Korpi | G06Q 50/30 |

* cited by examiner

AUTOMATIC ASSIGNMENT OF LOCATIONS TO MOBILE UNITS VIA A BACK-END APPLICATION COMPUTER SERVER

BACKGROUND

In some cases, an enterprise may want mobile units to visit various locations. For example, an enterprise might want a set of mobile units to visit a set of geographic locations so they can determine and/or verify information about those locations, and attempt to assign various locations to different mobile units in a logical manner (e.g., to reduce an amount of travel that would be required by each mobile unit). Manually reviewing the mobile units and locations to be visited, however, can be a time-consuming and error prone task, especially when there are a substantial number of locations and/or mobile units that need to be monitored (e.g., an enterprise might need to assign hundreds of locations) and/or the information that needs to be evaluated changes on a relatively frequent basis (e.g., on a daily or even an hourly basis).

It would therefore be desirable to provide systems and methods to automatically assign locations to mobile units in a way that results in faster, more efficient performance and that allows for flexibility and effectiveness when reviewing those assignments.

SUMMARY OF THE INVENTION

According to some embodiments, systems, methods, apparatus, computer program code and means to automatically assign locations to mobile units. In some embodiments, a back-end application computer server may access a location data store containing information about a set of locations to be visited, including location identifiers and location coordinates. The computer server may then prioritize the locations to be visited. A mobile unit data store may contain information about a set of mobile units, including mobile unit identifiers, mobile unit location coordinates, and mobile unit communication address. The computer server may then automatically assign each location to a mobile unit based on the location coordinates, the mobile unit location coordinates, a least one geo-fence established to define a region, and said prioritization. Indications of assigned locations may be transmitted to each mobile unit via the associated mobile unit communication address and electronic messages may be exchanged to support an interactive user interface display associated with assignments of locations to mobile units. According to some embodiments, the computer server may facilitate a collection of location information from the mobile devices.

Some embodiments comprise: means for accessing a location data store containing information about a set of locations to be visited, including, for each location to be visited, a location identifier and location coordinates; means for prioritizing, by the back-end application computer server, the set of locations to be visited; means for accessing a mobile unit data store containing information about a set of mobile units, including, for each mobile unit, a mobile unit identifier, mobile unit location coordinates, and mobile unit communication address; means for establishing at least one geo-fence defining a region; means for automatically assigning, by the back-end application computer server, each location to a mobile unit based at least in part on the location coordinates, the mobile unit location coordinates, the geo-fence, and said prioritization; means for transmitting indications of assigned locations to be visited to each mobile unit via the associated mobile unit communication address; and means for exchanging electronic messages, via a distributed communication network, to support at least one interactive user interface display associated with assignments of locations to mobile units, wherein the back-end application computer server facilitates a collection of location data from the assigned mobile units.

In some embodiments, a communication device associated with a back-end application computer server exchanges information with remote devices. The information may be exchanged, for example, via public and/or proprietary communication networks.

Technical effects of some embodiments of the invention are improved and computerized ways to utilize a decision making model that generates faster, more accurate identifications of electronic records for a supplemental review process and that allows for flexibility and effectiveness when reviewing those assignments. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of location assignments by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in the present invention locations may be automatically assigned to mobile units taking into account a wide variety of considerations, thus improving the overall performance of the system associated with travel requirements and/or response time considerations (e.g., by reducing an overall amount of travel). Moreover, embodiments associated with automatic prioritizations and/or assignments might further improve communication network performance, user interactions, real time chat or telephone call center responsiveness (e.g., by better preparing and/or allocating mobile units in cases of widespread need), etc.

An enterprise may want mobile units to visit various locations. For example, an enterprise might want a set of mobile units to visit a set of buildings so they can determine and/or verify information about those buildings, and attempt to assign various buildings to different mobile units in a logical manner (e.g., to reduce an amount of travel that would be required by each mobile unit). Manually reviewing the mobile units and buildings to be visited, however, can be a time-consuming and error prone task, especially when there are a substantial number of buildings and/or mobile units that need to be monitored (e.g., an enterprise might need to assign hundreds of different buildings to mobile units) and/or the information that needs to be evaluated changes on a relatively frequent basis (e.g., on a daily or even an hourly basis).

Figure 1:
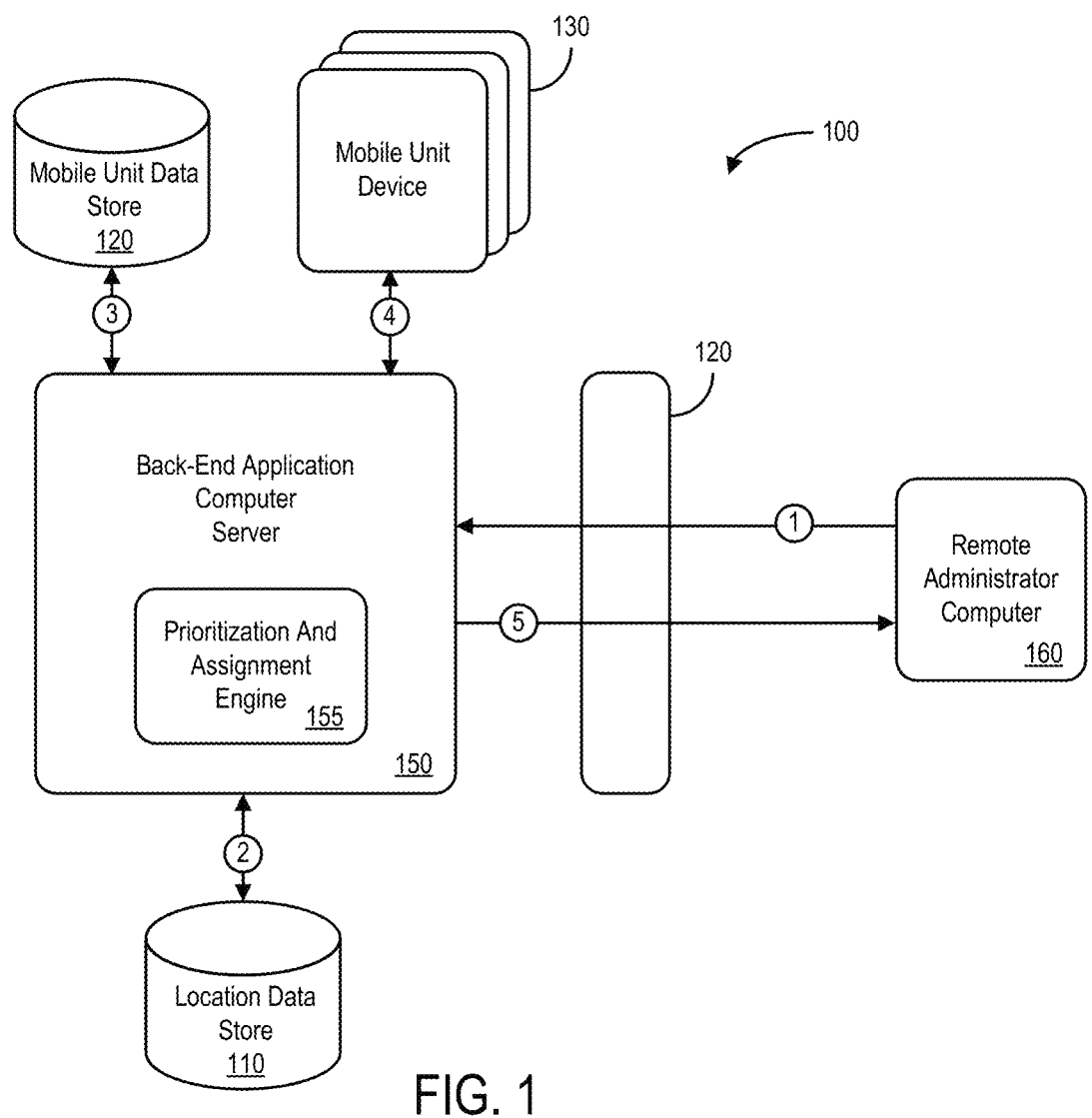
FIG. 1 is a high-level block diagram of a system according to some embodiments.

It would be desirable to provide systems and methods to utilize a prioritization and assignment process that generates faster, more efficient performance and that allows for flexibility and effectiveness when reviewing those assignments. FIG. 1 is a high-level block diagram of a system 100 according to some embodiments of the present invention. In particular, the system 100 includes a back-end application computer server 150 that may access information in a location data store 110 (e.g., storing a set of electronic records representing locations to be visited, each record including one or more location identifiers, location coordinates, communication addresses, attribute variables, record characteristic values, etc.). The back-end application computer server 150 may also exchange information with a remote administrator computer 160 (e.g., via a firewall 120). According to some embodiments, a prioritization and assignment engine 155 of the back-end application computer server 150 may access information in a mobile unit data store 120 (e.g., including location coordinates of various mobile units), prioritize and/or assign various locations to each mobile unit as appropriate, and transmit indications of those assignments to mobile unit devices 130 and/or the remote administrator computer 160. Note that embodiments may be associated with periodic (or asynchronous) types of prioritization, assignment, and/or scheduling. Further note that the back-end application computer server 150 might be associated with a third party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may automatically prioritize and/or assign the location data store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the location data store 110 and/or the mobile unit device store 120. The location data store 110 might, for example, store electronic records representing an entities potential liability associations with various parties, each electronic record being associated with a different location identifier, location coordinates, communication address, record characteristic values, attribute variables, etc. The location data store 110 may also contain information about past and current interactions with parties, including those associated with remote communication devices. The location data store 110 may be locally stored or reside remote from the back-end application computer server 150. As will be described further below, the location data store 110 may be used by the back-end application computer server 150 to automatically prioritize and/or assign locations to mobile units. Although a single back-end application computer server 150 is shown in FIG. 1, any number of such devices may be included. Moreover, various devices described herein might be combined according to embodiments of the present invention. For example, in some embodiments, the back-end application computer server 150, location data store 110, and/or mobile unit data store 120 might be co-located and/or may comprise a single apparatus.

According to some embodiments, the system 100 may automatically prioritize and/or assign locations to mobile devices via the automated back-end application computer server 150. For example, at (1) the remote administrator computer 160 may request that a batch of locations be assigned to mobile units (e.g., at the start of a workday). At (2), the back-end application computer server 150 may access location information from the location data store 110 and prioritize those locations (e.g., locations that have been waiting the longest to be visited by a mobile unit might be given higher priorities). At (3), the prioritization and assignment engine 155 may access information in the mobile unit data store 120 and assign each location to an appropriate mobile unit (e.g., to minimize an amount that each mobile unit will need to travel to visit each assigned location), and indications of these assignments may be transmitted to mobile unit devices 130 at (4) and/or the remote administrator computer 160 at (5).

Figure 2:
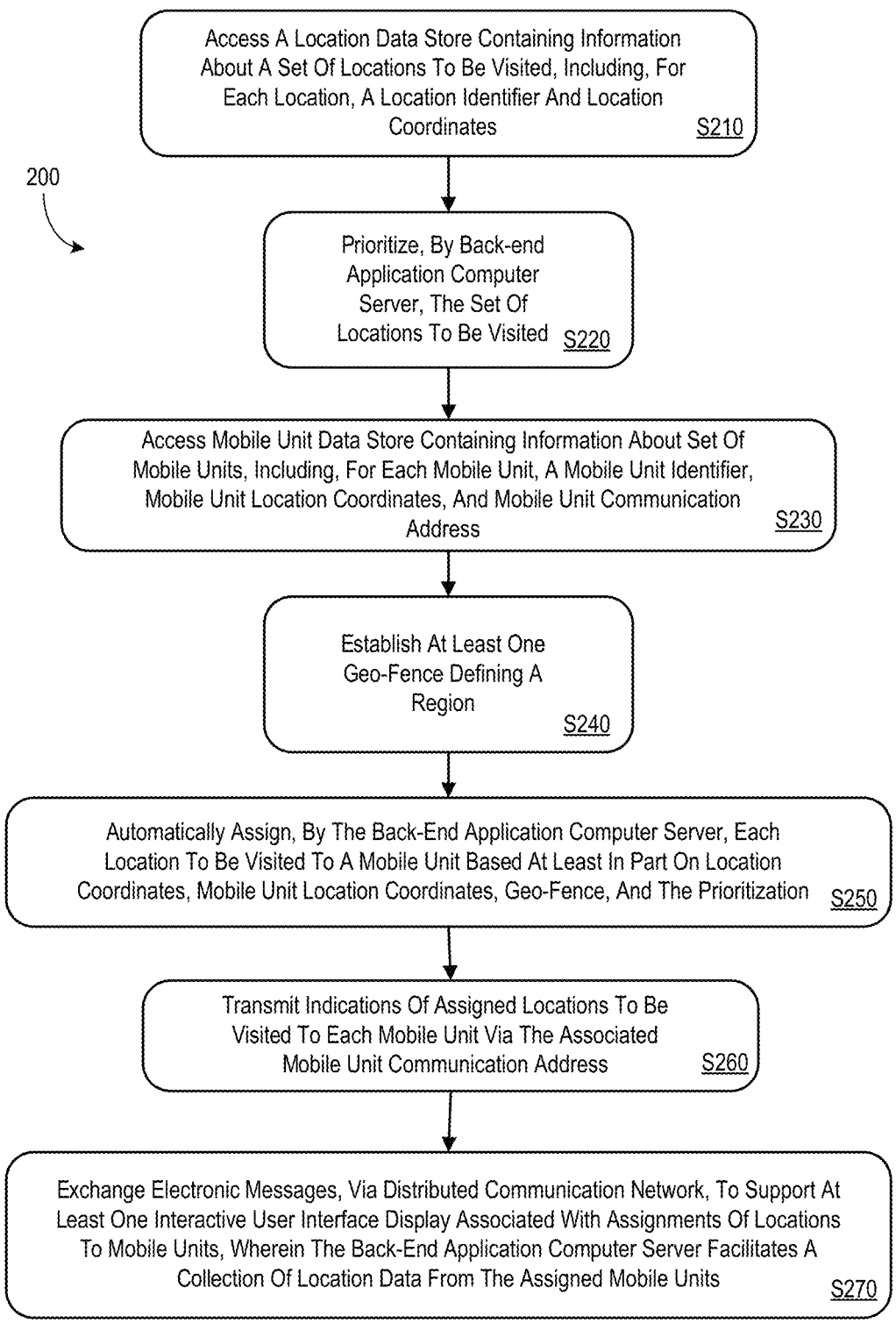
FIG. 2 illustrates a method according to some embodiments of the present invention.

Note that the system 100 of FIG. 1 is provided only as an example, and embodiments may be associated with additional elements or components. According to some embodiments, the elements of the system 100 automatically support interactive user interface displays over a distributed communication network. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an automated back-end application computer server may access a location data store containing information about a set of locations to be visited, including, for each location to be visited, a location identifier and location coordinates. At S220, the automated back-end application computer server may prioritize the set of locations to be visited (e.g., with the most important locations receiving higher priorities). The priorities might be based on, for example, an urgency associated with the location, an amount of time the location has been waiting to be visited by a mobile unit, etc.

At S230, the automated back-end computer server may access a mobile unit data store containing information about a set of mobile units, including, for each mobile unit, a mobile unit identifier, mobile unit location coordinates, and mobile unit communication address. As used herein, the phrases "location coordinate" and/or "mobile unit location coordinate" might refer to, for example, a postal address, a ZIP code, Global Positioning System ("GPS") information, latitude and longitude values, mobile telephone location data (e.g., indicating the nearest cell phone tower), etc.

At S240, one or more geo-fences may be established, with each geo-fence defining a region. For example, a geo-fence might be constructed around each location (e.g., based on how far a mobile unit would need to travel to reach the location, how long it would take a mobile unit to reach the location, etc.). In this case, when a mobile unit moves within that particular geo-fence, a message might be transmitted to that mobile unit asking if an assignment to the location would be acceptable.

At S250, the system may automatically assign each location to a mobile unit based at least in part on the location coordinates, the mobile unit location coordinates, and the prioritization performed at S220. According to some embodiments, this assignment process includes transmitting a first assignment request to a first mobile unit and, if the first mobile unit accepts the first request, assigning the location to be visited to the first mobile unit. If the first mobile unit does not accept the first request, the system may transmit a second assignment request to a second mobile unit. Note that the assignment might be based on a current location of a mobile unit, a default location (e.g., a home office address), or a future predicted location. For example, if the system is aware that a particular mobile unit will be visiting a particular location later in the day, the location of that particular location might be used to select other nearby locations for that mobile unit (e.g., creating a "chain" or sequence of locations to be visited).

At S260, the system may transmit indications of assigned locations to be visited to each mobile unit via the associated mobile unit communication address. For example, the back-end application computer server might transmit an indication via a mobile telephone number, a vehicle identifier, a user identifier (e.g., associated with a user name and password), an IP address, a device identifier associated with a push message registration, etc.

At S270, a communication port coupled to the back-end application computer server may facilitate an exchange of electronic messages, via a distributed communication network, supporting at least one interactive user interface display associated with assignments of locations to mobile units. The interactive user interface display might be associated with, for example, a mobile unit, a client associated with a location to be visited, and/or an enterprise associated with the set of mobile units. According to some embodiments, the back-end application computer server might facilitate a collection of location data from mobile devices (e.g., a mobile devices might transmit images, video, text, voice memos, directly from a location to be stored via a cloud application).

Figure 3:
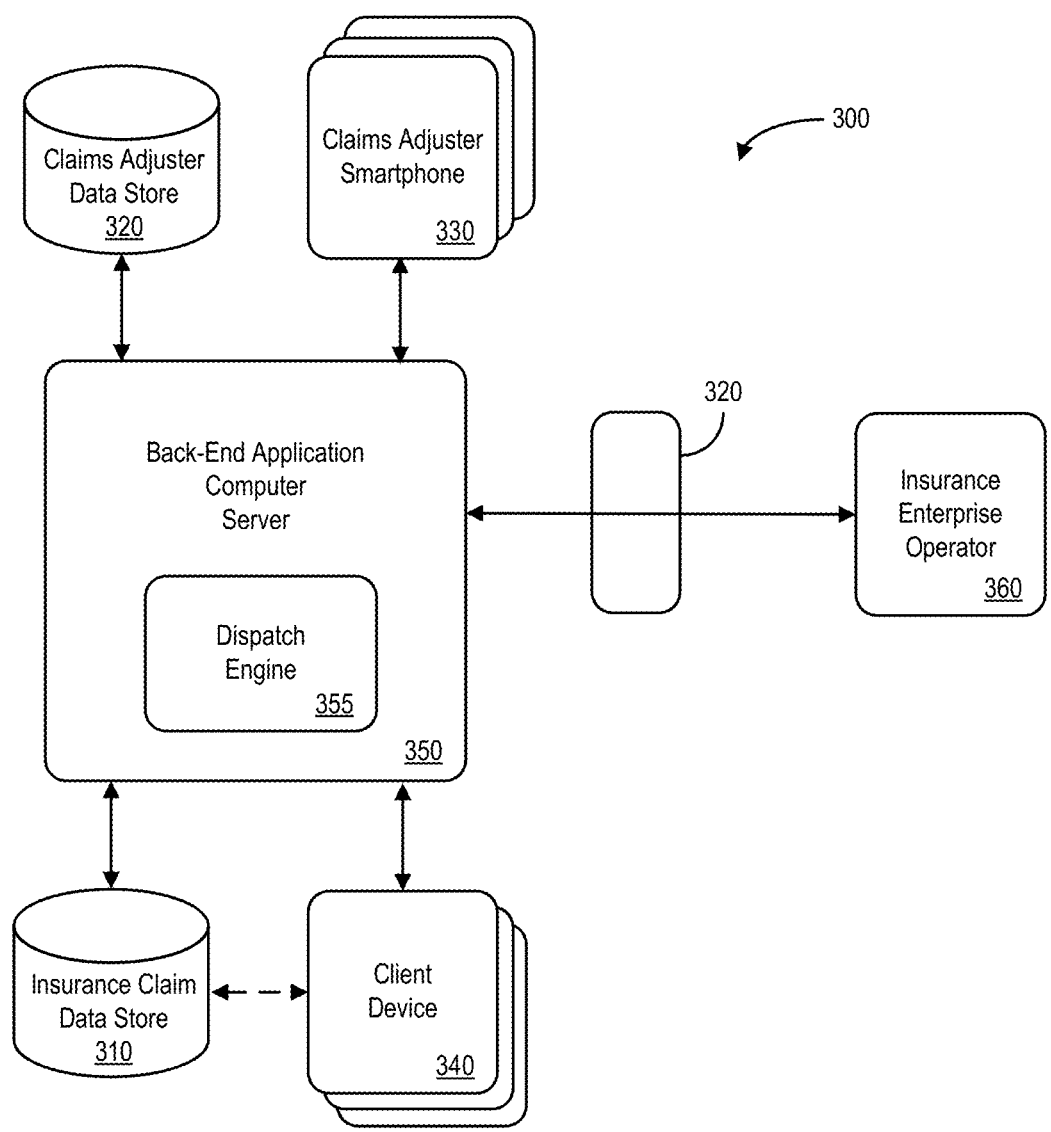
FIG. 3 is a high-level block diagram of an insurance enterprise system according to some embodiments of the present invention.
Figure 4:
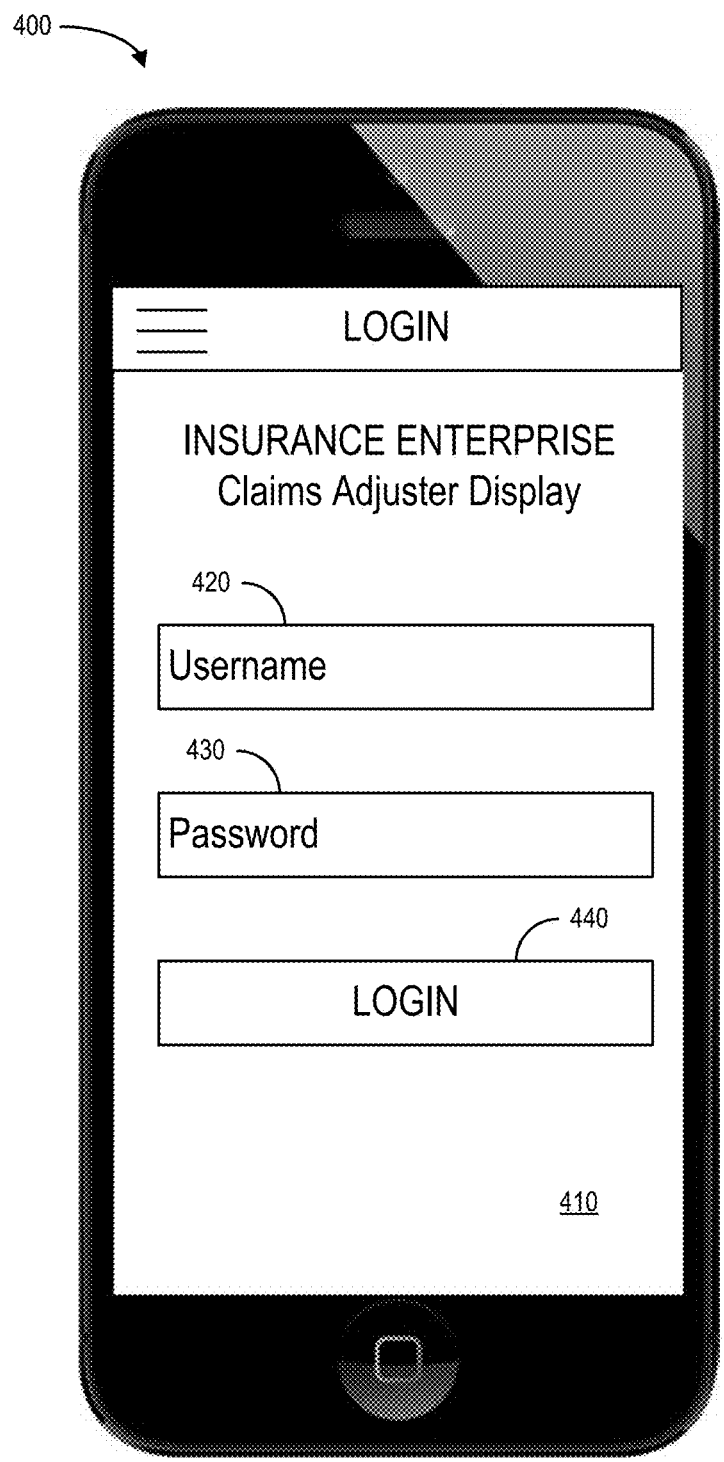
FIGS. 4 through 10 illustrate smartphone claims adjuster displays in accordance with some embodiments.
Figure 5:
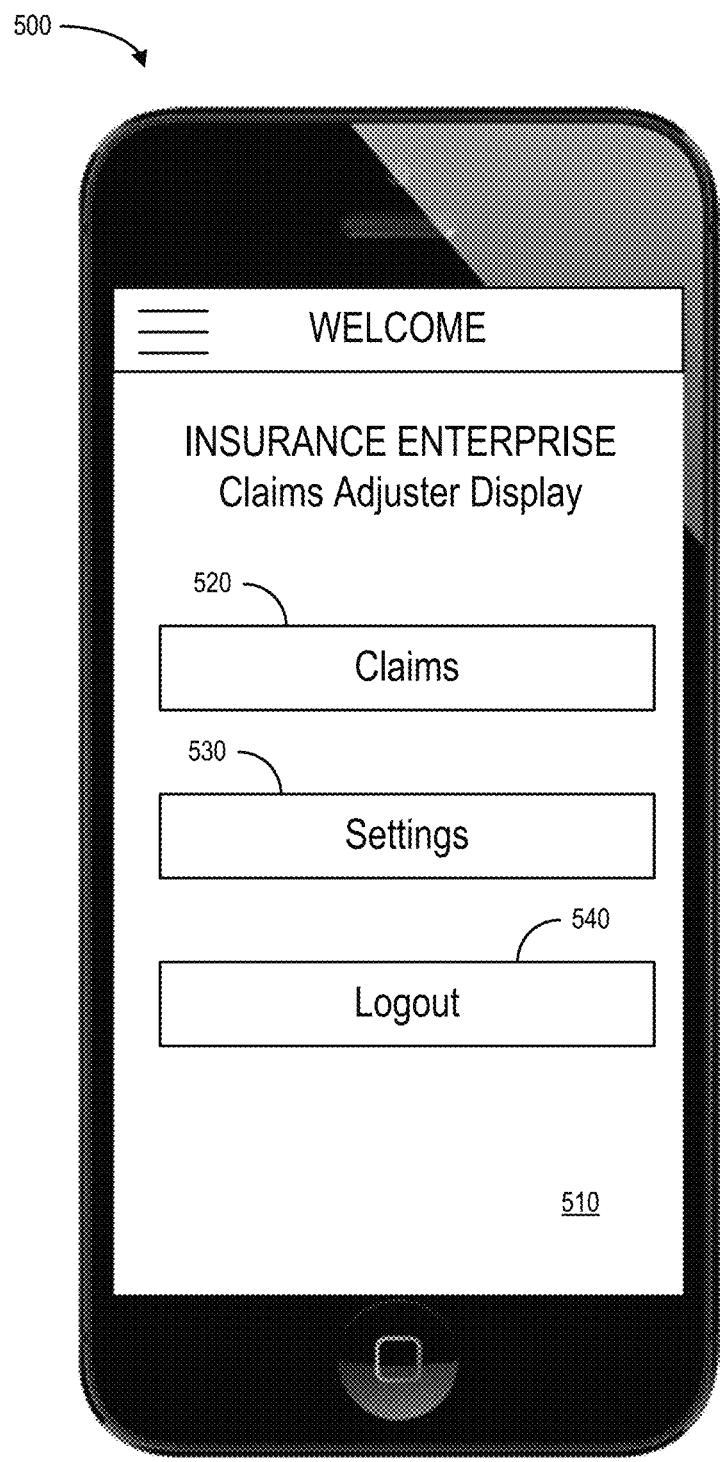
Figure 6:
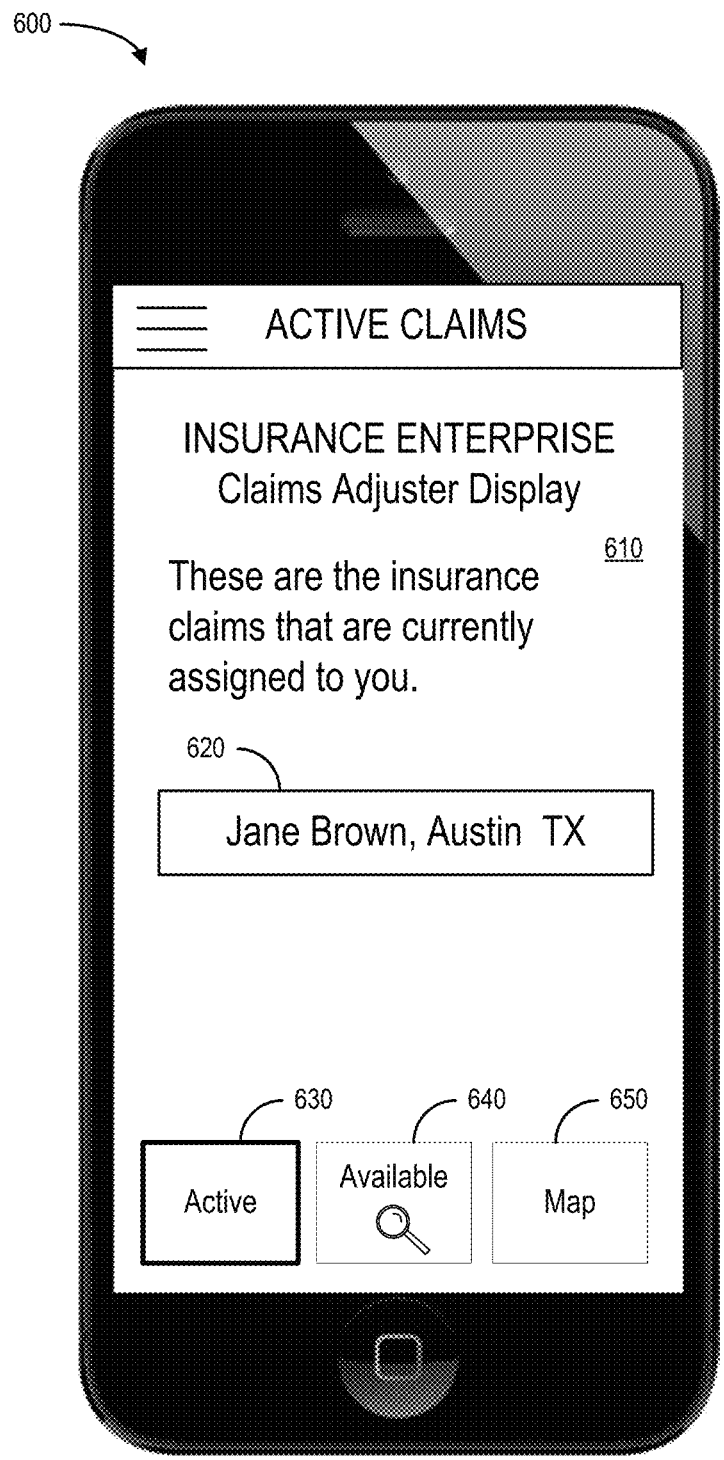
Figure 7:
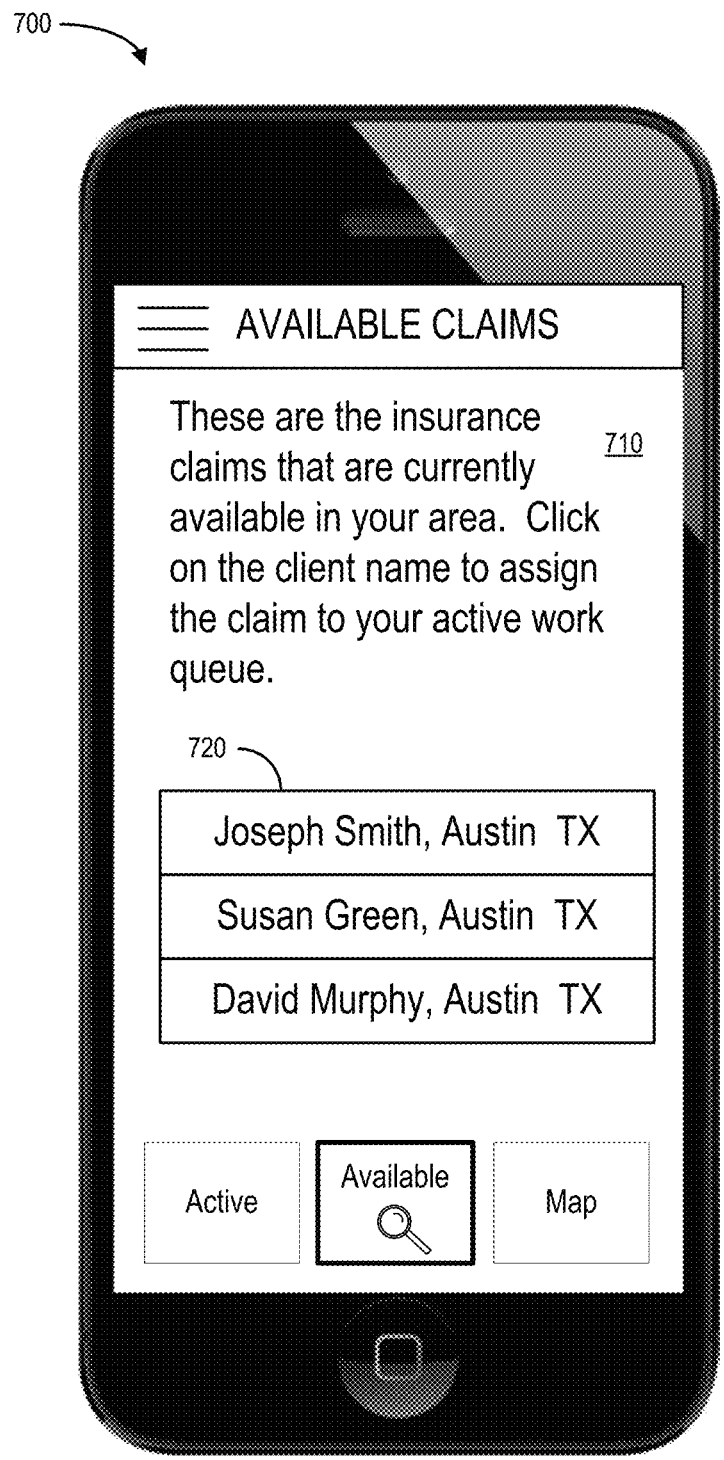
Figure 8:
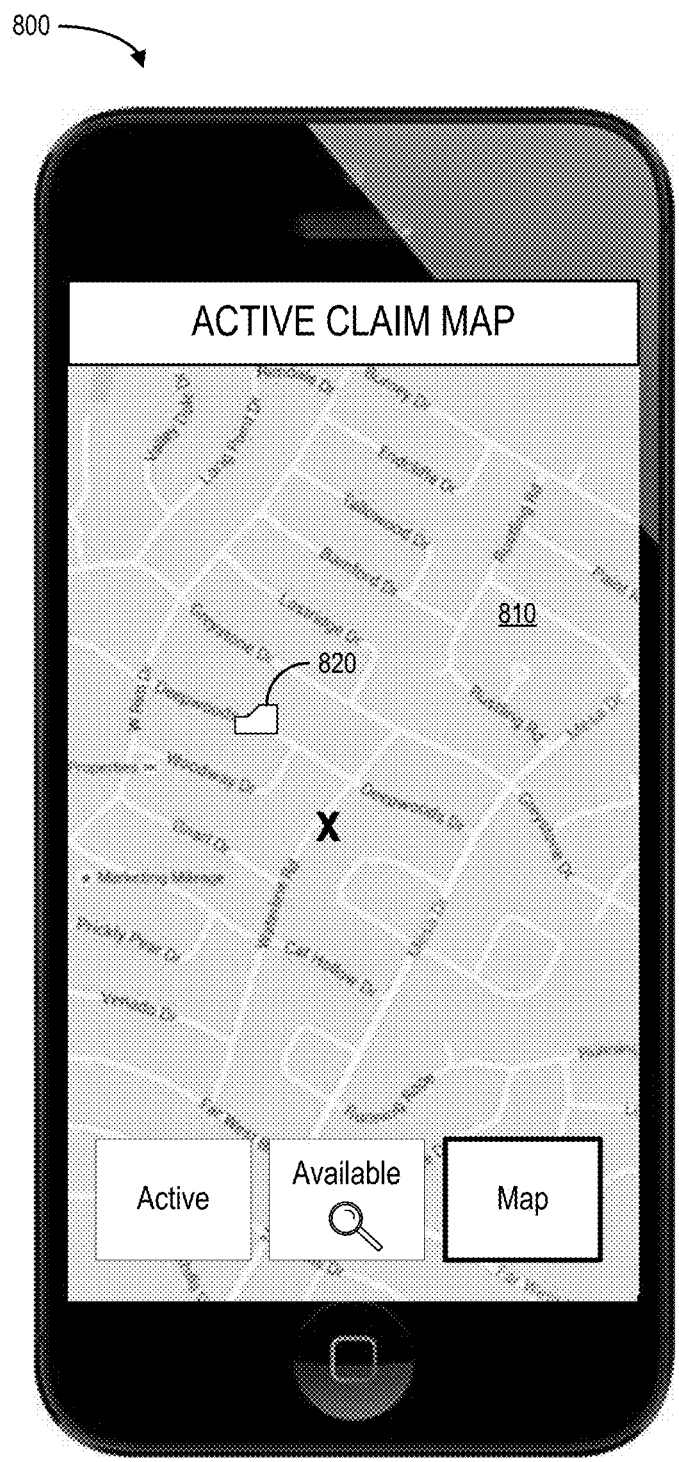

Note that embodiments described herein may be utilized by different types of enterprises. For example, FIG. 3 is a high-level block diagram of an insurance enterprise system 300 according to some embodiments of the present invention. As before, the system 300 includes an insurance enterprise back-end application computer server 350 that may access an insurance claim data store 310 (e.g., each record representing a location associated with an insurance claim and including one or more claim identifiers, location coordinates, communication addresses, characteristic values, attribute variables, etc.). The information in the insurance claim data store 310 might be based at least in part, for example, on information received from client devices 340 (e.g., as clients report damage to properties). The back-end application computer server 350 may also exchange information with a remote insurance enterprise operator 360 (e.g., via a firewall 320). According to some embodiments, a dispatch engine 355 of the back-end application computer server 350 may prioritize insurance claims. By way of example, a priority value P might be calculated for each insurance claim as follows:

$$P = \left(CVW \frac{ECV}{ACV}\right) \times \left(DVW \frac{DW}{ADW}\right) \times \left(TOW \frac{TCO}{ATCO}\right)$$

where ACV is an average claim value for a given area, ECV is an estimated claim value, CVW is a claim value weighting, ADW is an average damage weighting, DW is a damage weighting (e.g., with 1 representing insignificant, 2 representing customer inconvenience, 3 representing a safety concern or a potential of further damage), DVW is a damage value weighting, ATCO is an average claim open time, TCO is a time claim open, and TOW is a time open weighting. Note that embodiments described herein might be associated with any type of claim damage, including physical damage to property, medical injuries, etc.

The dispatch engine 355 may also facilitate an assignment of those insurance claims to insurance claims adjusters based on information in a claims adjuster data store 320. Indications of those assignments may then be transmitted to claims adjuster smartphones 330, client devices 340, and/or the insurance enterprise operator 360. According to some embodiments, the interactive user interface display is associated with the client who submitted the insurance claim and includes a map containing information about the claims adjuster assigned to the insurance claim (and selection of an icon associated with the claims adjuster results in a display of detailed information about that claims adjuster). According to other embodiments, the interactive user interface display is associated with the claim adjuster and includes a map containing information about a plurality of insurance claims (and selection of an icon associated with a particular insurance claim results in a display of detailed information about that particular insurance claim). According to still other embodiments, interactive user interface display is associated with the insurance enterprise and includes a map containing information about a plurality of claims adjusters (and selection of an icon associated with a particular claims adjuster results in a display of detailed information about that particular claims adjuster). Still other embodiments might automatically calculate a payment amount for a claims adjuster and/or facilitate processing of payment. For example, a priority claim bonus might be provided to a claims adjuster in addition to the amount listed on the National Flood Insurance Program ("NFIP") fee schedule published by the Federal Emergency Management Agency ("FEMA"). According to some embodiments, claims adjusters might be compensated and/or prioritized (e.g., with high-priority adjusters being more likely to be assigned claim locations) based on ratings provided by customers (e.g., indicating how satisfied each customer was with his or her claims adjuster).

The back-end application computer server 350 might be, for example, associated with a PC, laptop computer, smartphone, an enterprise server, a server farm, and/or a database or similar storage devices. Devices, including those associated with the back-end application computer server 350 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet.

According to some embodiments, the back-end application computer server 350 receives, from each client, rating information about the assigned claims adjuster. For example, each client might indicate whether or not he or she was satisfied with the service performed by the claims adjuster. The back-end application computer server 350 might also receive, from each claims adjuster, insurance claim information including text comprising insurance claim notes, images, and/or audio information. According to some embodiments, information about the insurance claims in the insurance claims data store may be dynamically collected via an email received by an email server, information provided a web interface, an Interactive Voice Response ("IVR") system associated with a telephone call center, a chat application that interacts with a party in substantially real time, and/or a video link with clients. As used herein, insurance claim information may be "dynamically" collected from claimants during the day (e.g., as claims adjusters are driving around visiting claims locations) and may be handled in an automated and efficient way. After insurance claims are resolved, the back-end application computer server 350 may further periodically monitor performance outcomes (e.g., customer satisfaction) and automatically adjust prioritization and or assignment algorithms in the dispatch engine 355.

According to some embodiments, a claims adjuster may sign into a smartphone application to view his or her assigned claims for the day, which have been optimized for minimal travel distance within a certain region. For example, FIGS. 4 through 10 illustrate smartphone claims adjuster displays in accordance with some embodiments. In particular, FIG. 4 includes a smartphone 400 with a login display 410 that a claims adjuster can use to enter his or her username 420 and password 430 to login 440 to an insurance enterprise system. When the claims adjuster selects login 440 (and his or her username and password are verified), a welcome display might be provided. For example, FIG. 5 includes a smartphone 500 with a welcome display 510 according to some embodiments. The welcome display 510 might let the claims adjusted view claims 520, settings 530 (e.g., how many locations he or she is willing to visit each day), and/or logout 540 from the insurance enterprise system.

If the claims adjuster selects the "Claims" icon 520, an active claims display might be provided. For example, FIG. 6 includes a smartphone 600 with an active claims display 610 in accordance with some embodiments. The display 610 includes a list 620 of all insurance claims that are currently assigned to the claims adjuster. According to some embodiments, the display 610 further includes selections to view "Active" claims 630 (illustrated in FIG. 6), "Available" claims 640 (illustrated in FIG. 7), and a map of claims 650 (illustrated in FIG. 8). That is, selection of the "Available" claims results in the available claims display 710 of FIG. 7, including a list 720 of all of the insurance claims that are currently available in his or her area. The claims adjuster can then select claims from the list 720 to assign that claim to his or her active work queue. Similarly, selection of the map of claims results in the map display 810 of FIG. 8, including a current location vehicle icon 820 and indication the insurance claims in his or her area (illustrated with an "X" in FIG. 8). According to some embodiments, other information might be provided on the map, such as a current location of a tow truck, repairman, etc. The claims adjuster can then select claims from the map display 810 to view more information about those claims.

Figure 9:
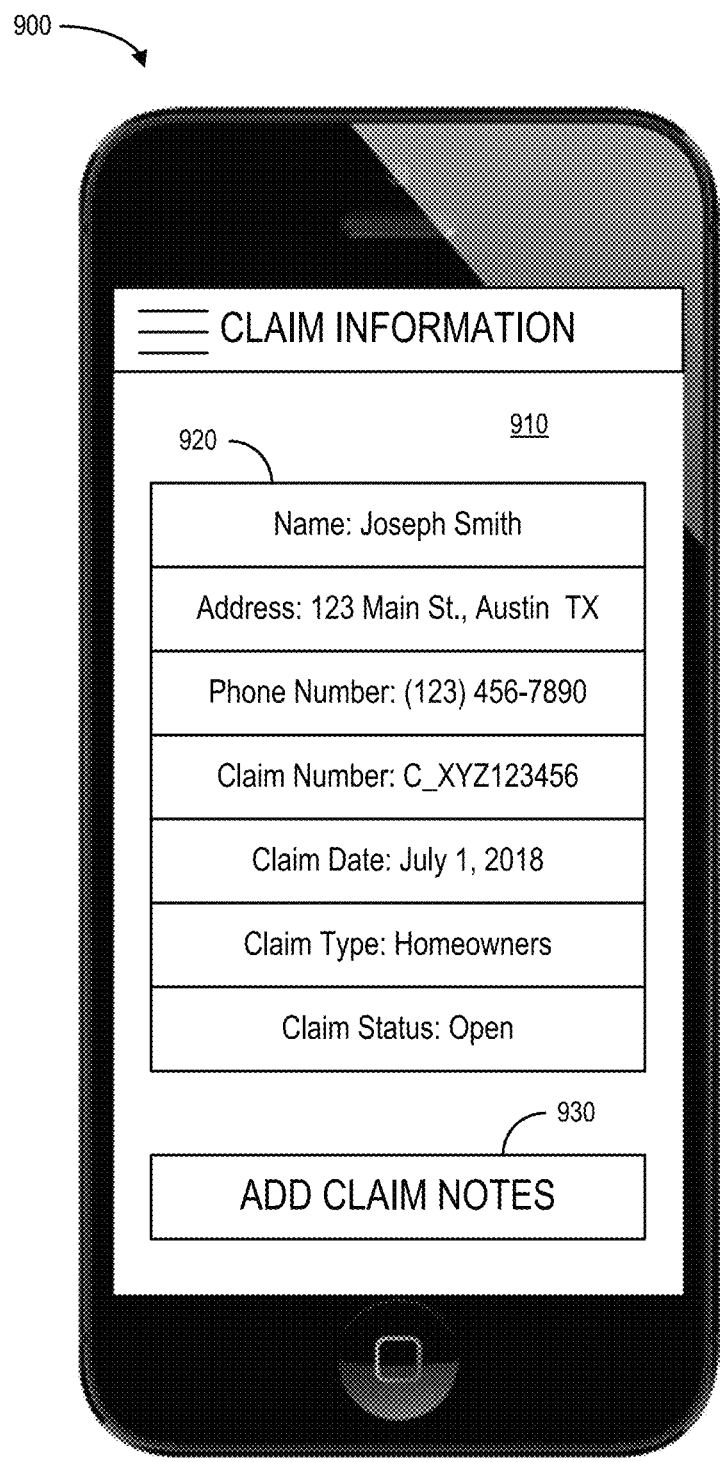
Figure 10:
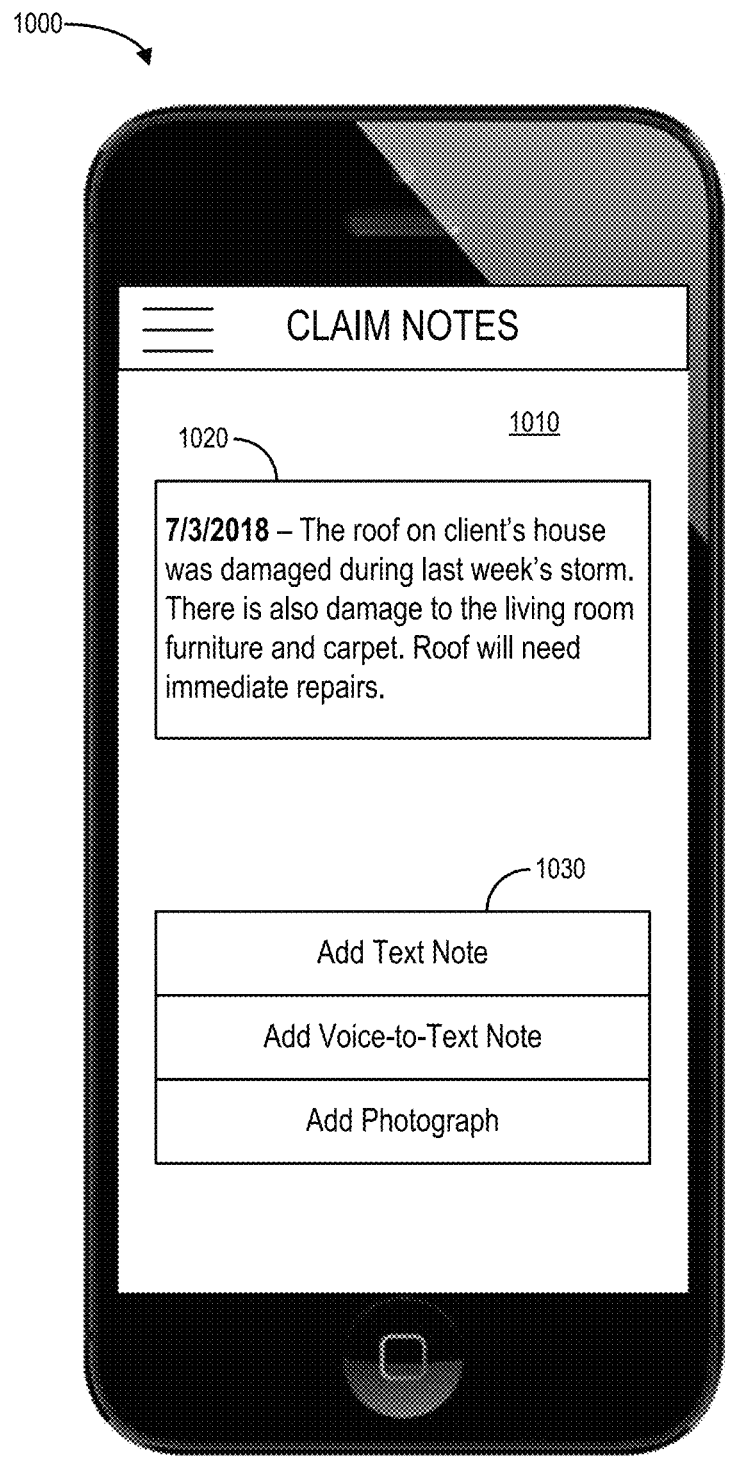

FIG. 9 includes a smartphone 900 with a claim information display 910 in accordance with some embodiments. The claim information display 910 includes claim details 920, such as a claimant name, address, telephone number, claim number claim date, claim type, claim status, etc. The claims adjuster may select an "Add Claim Notes" icon 930 to provide further information about the insurance claim. For example, FIG. 10 includes a smartphone 1000 with a claim notes display 1010 that a claims adjuster can use to provide additional information 1020 about an insurance claim. According to some embodiments, the claims adjuster might select 1030 to add a text note, a voice-to-text note, and/or a photograph (e.g., captured with the smartphone's 1000 camera). As other example, the display 1010 might support uploading, to a cloud-based application, video information, weather information (e.g., a temperature, noise level, wind speed, barometric pressure, etc.), and environmental quality information (e.g., air quality, water contamination, etc.).

According to some embodiments, as a claims adjuster travels from one claim to another, if his or her geo-location bisects the geospatial region of another claim, the adjuster will be notified about that claim via a push notification to his or her mobile phone, vehicle display etc. The claims adjuster might then have a set period of time to accept (or reject) that claim. If the claim is not accepted, the system may locate the next closest adjuster and attempt to assign the claim to them. When a claims adjuster accepts a claim, the client may be notified that his or her claim has been assigned along with an Estimated Time of Arrival ("ETA"). When the adjuster is en route to the claim location, the client's mobile application may receive push notifications and be able to track the current location of the claims adjuster along with the adjuster's name, picture, and/or vehicle information. Note that the ETA information may be pushed to the insured's device with automated updates as conditions change (e.g., traffic conditions). After the insurance claim is serviced, the client's mobile app may provide the ability to rate the claim adjuster.

This information may then be compiled into a cumulative rating for the adjuster to see via the adjuster's mobile app.

According to some embodiments, a software application will also have a visualizer administration application that shows the location of all claims on a map with color coded regions around each claim reflecting the amount of time the claim has remained open. Each claims adjuster using the mobile application may, according to some embodiments, automatically report his or her current location using the GPS functions of their smartphone. These locations may be received by an enterprise application where they will be visible on a map in the form of a small vehicle icon. A claims administrator could therefore have a wide-scale view of all claims on a map (and may zoom in for a closer look at a particular region). Details about a claims adjuster, or a particular claim, may be retrieved by clicking on icons located on the map.

Figure 11:
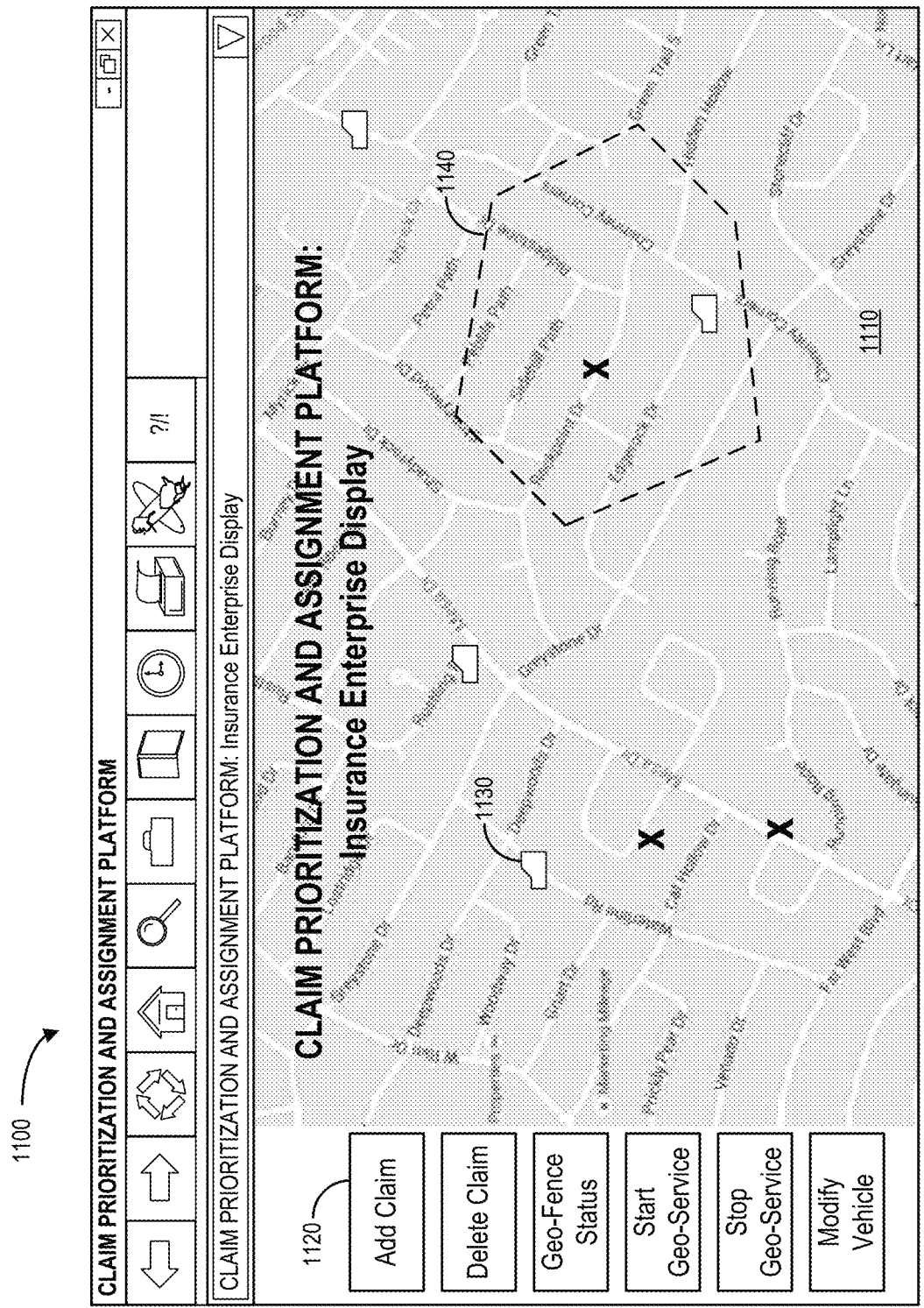
FIGS. 11 and 12 illustrate desktop insurance enterprise displays that might be associated with various embodiments.
Figure 12:
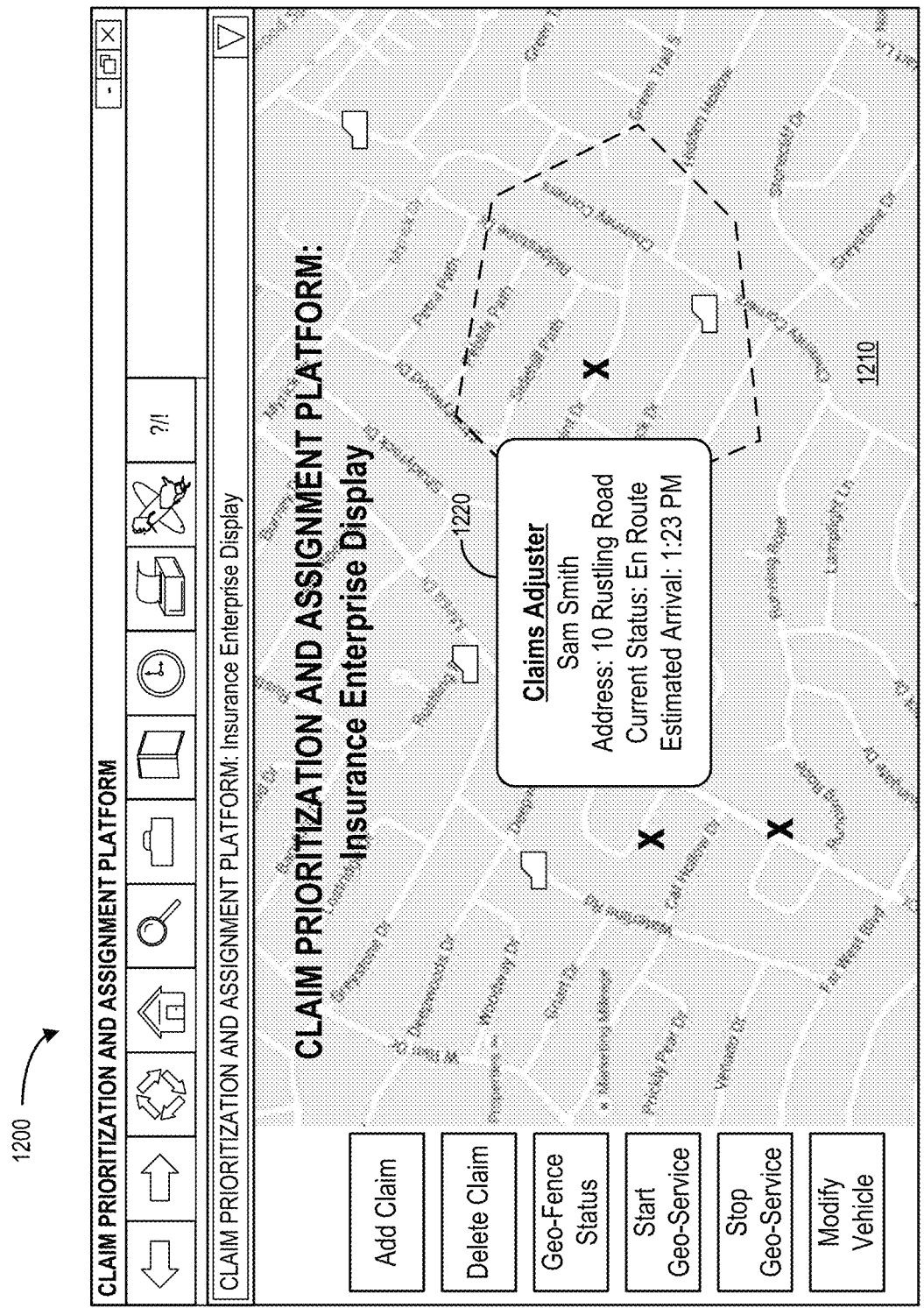

For example, FIGS. 11 and 12 illustrate desktop insurance enterprise displays that might be associated with various embodiments. FIG. 11 illustrates a desktop 1100 insurance enterprise display 1110 including map information. The display 1110 also includes options 1120 to select "Add Claim," "Delete Claim," "Geo-Fence Status," "Start Geo-Service," "Stop Geo-Service," and "Modify Vehicle." A vehicle icon 1130 is displayed for each claims adjuster in the area along with the locations of each insurance claim (illustrated with an "X" in FIG. 11). According to some embodiments, the automatic assignment of insurance claims to claims adjusters includes establishing, for each location to be visited, a geo-fence region 1140 representing that location (e.g., indicating a distance from the claim, a time of travel from the claim, etc.). According to some embodiments a geo-fence region might be established for each mobile unit. Note that a geo-fence might be established to define a region based on or more of a location to be visited, a population density (e.g., with different sized regions being appropriate for New York city as compared to Texas), a location density (e.g., when an event causes a lot of claims to be simultaneously reported in an area), a mobile unit density, and/or priority information (with higher priority claim locations being given larger regions). Note that a geo-fence region could be calculated using distance information (e.g., a driving distance, as-the-crow-flies, etc.), time information (e.g., how long it would take to a travel location based on traffic information, weather information, including moving weather conditions, speed limit information, etc. According to some embodiments a geo-fence might be defined in accordance with jurisdiction information. For example, a geo-fence might intentionally exclude a neighboring state where a particular claims adjuster is not licensed.

According to some embodiments, an insurance enterprise might select an icon to receive further information. For example, FIG. 12 is a desktop 1200 insurance enterprise display 1210 including additional details 1220 about a claims adjuster (e.g., his or her name, current location, status, and/or ETA).

Figure 13:
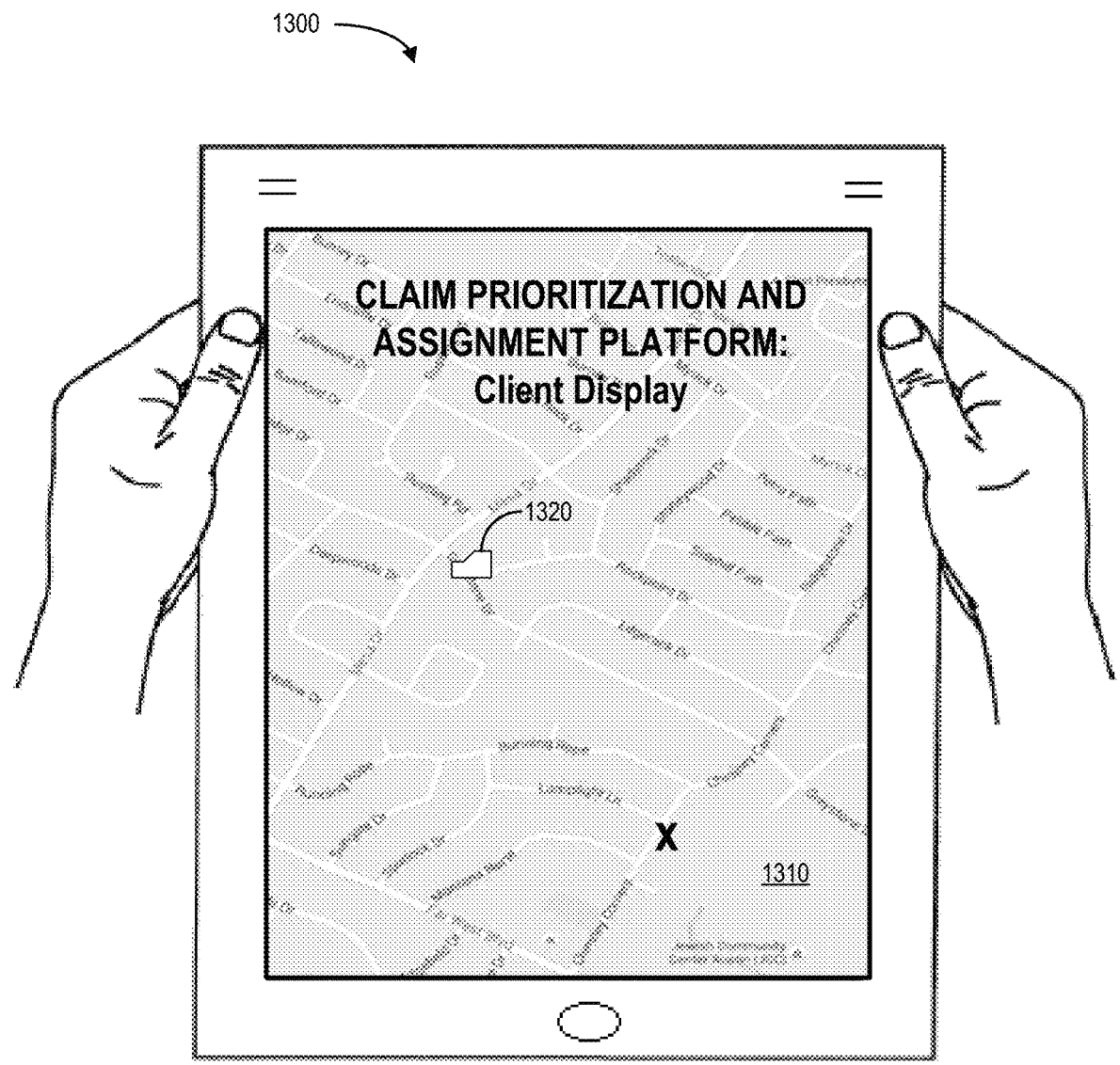
FIGS. 13 and 14 illustrate tablet client displays in accordance with some embodiments.
Figure 14:
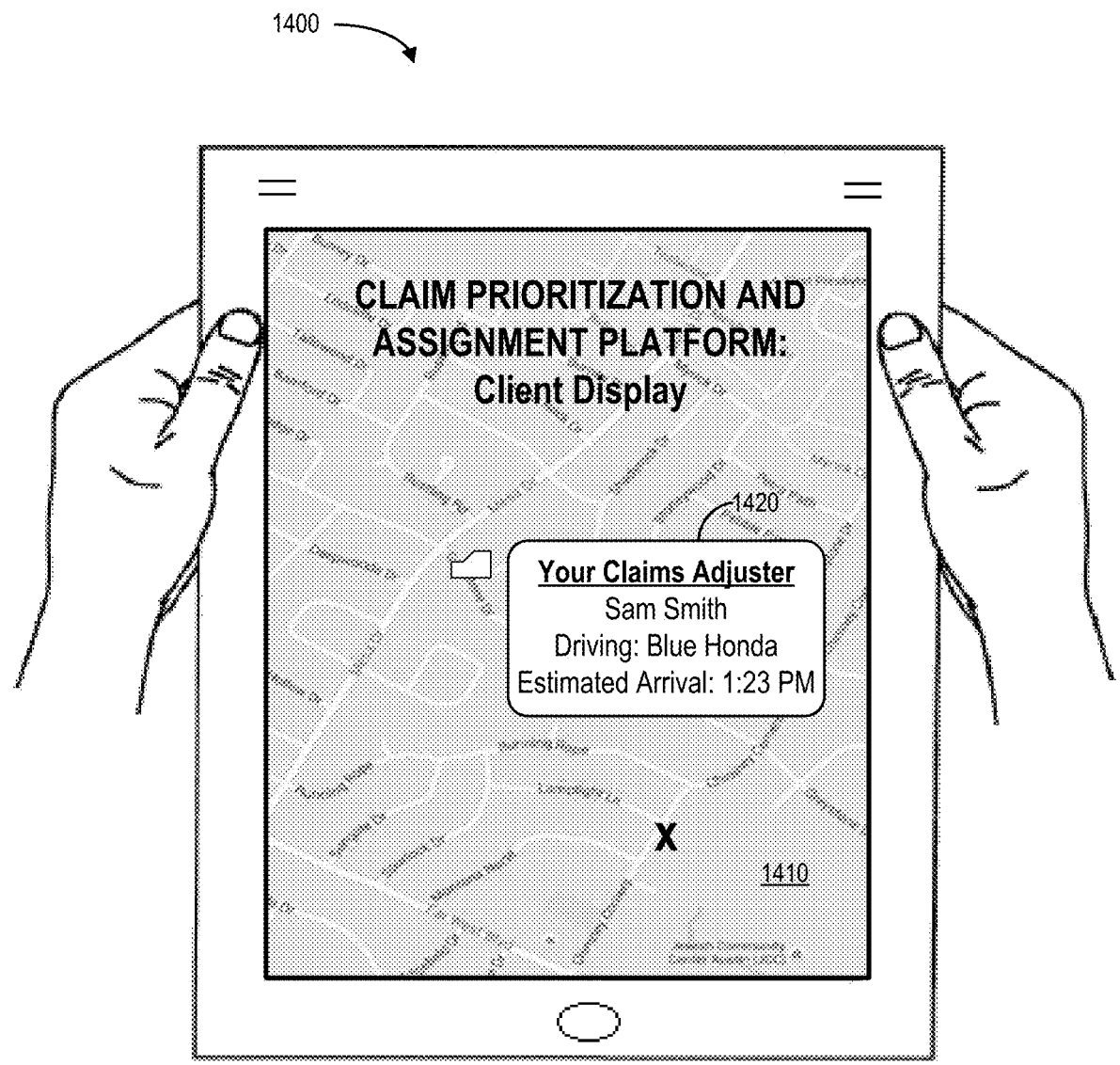

FIGS. 13 and 14 illustrate tablet client displays in accordance with some embodiments. In particular, FIG. 13 illustrates a table 1300 client display 1310 including map information. The display 1310 also includes a vehicle icon 1320 for the assigned claims adjuster with the location of the insurance claim (illustrated with an "X" in FIG. 13). According to some embodiments, client might select an icon to receive further information. For example, FIG. 14 is a tablet 1400 client display 1410 including additional details 1420 about the assigned claims adjuster (e.g., his or her name, vehicle description, and/or ETA).

Figure 15:
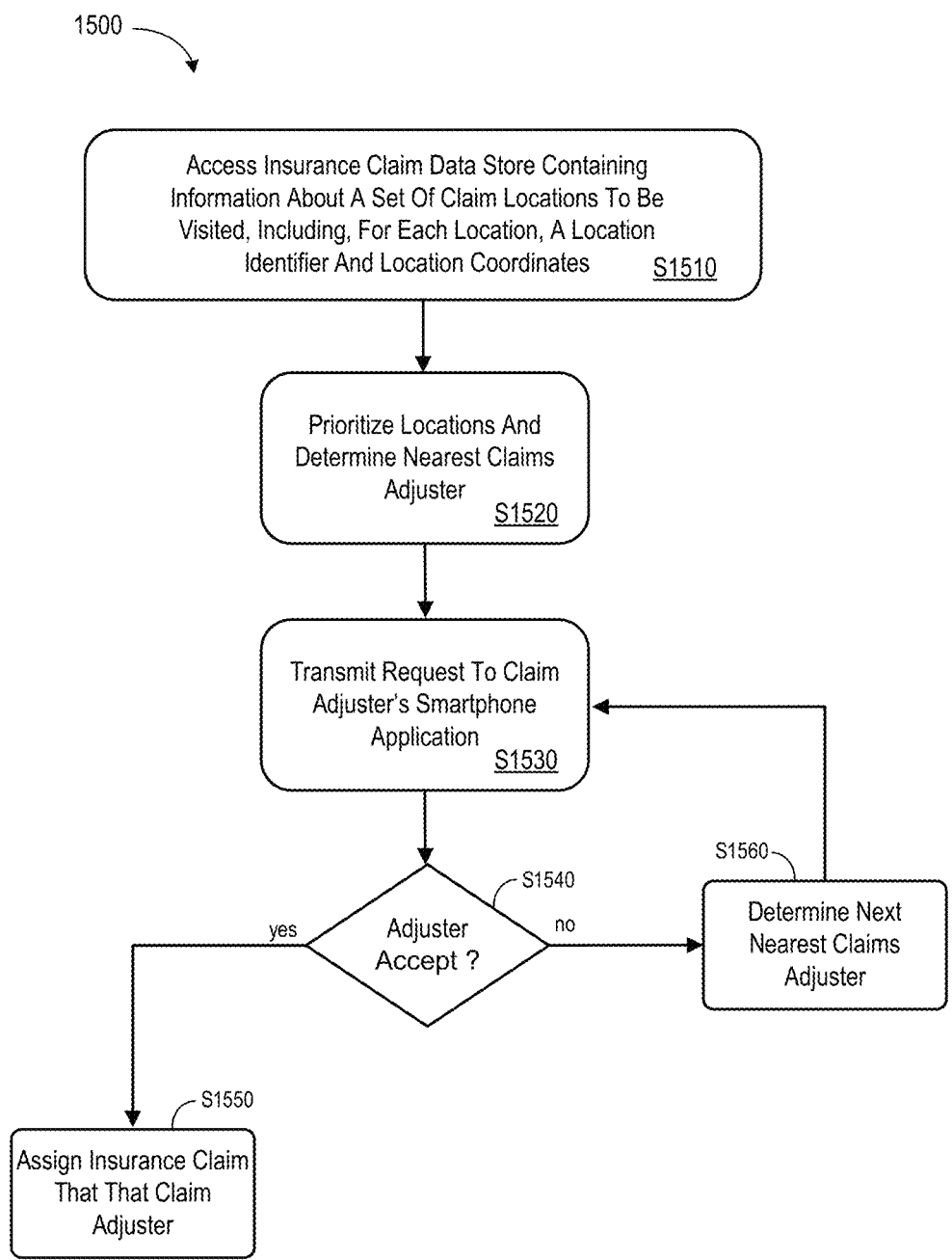
FIG. 15 illustrates a method according to some embodiments of the present invention.

FIG. 15 illustrates a method 1500 according to some embodiments of the present invention. At S1510, the system may access an insurance claim data store containing information about a set of claim locations to be visited, including, for each location, a location identifier and location coordinates. At S1520 the system may prioritize the claim locations (e.g., based on the size or estimated value of the claims, the type of claim damage, the time the claim was submitted, etc.) and select a claim adjuster (e.g., based on the priority information, geo-spatial regions, etc.). At S1530, the system transmits a request to that claims adjuster smartphone application (e.g., via a push notification). If the claims adjuster accepts the request at S1540, the insurance claim is placed into his or her active work queue at S1550. If the claims adjuster does not accept the request at S1540 (including by failing to transmit a response within a pre-determined period of time), the next-best claims adjuster is selected at S1560 and the process continues at S1530 by transmitted a request to that claims adjuster.

Figure 16:
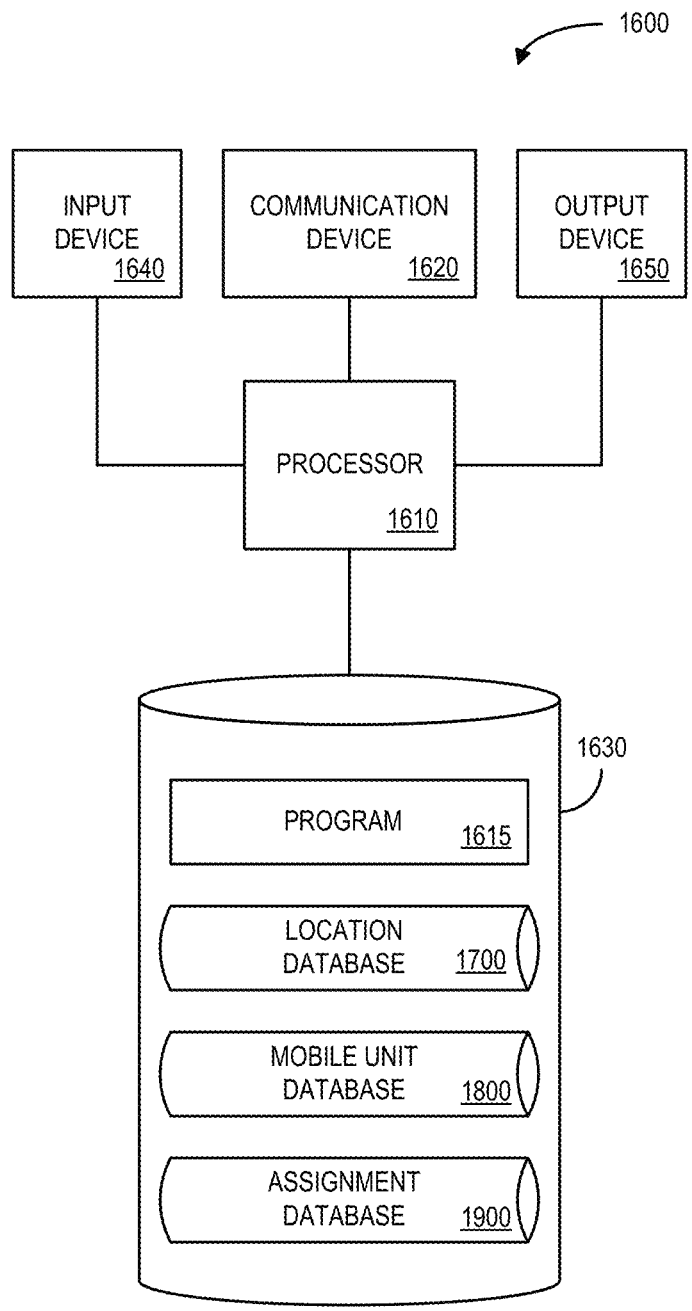
FIG. 16 is a block diagram of an apparatus in accordance with some embodiments of the present invention.

Embodiments described herein may comprise a tool that gives guidance and a suggested list of location and mobile using assignments and may be implemented using any number of different hardware configurations. For example, FIG. 16 illustrates a back-end application computer server 1600 that may be, for example, associated with the systems 100, 300 of FIGS. 1 and 3, respectively. The back-end application computer server 1600 comprises a processor 1610, such as one or more commercially available Central Processing Units ("CPUs") in the form of one-chip microprocessors, coupled to a communication device 1620 configured to communicate via a communication network (not shown in FIG. 16). The communication device 1620 may be used to communicate, for example, with one or more remote administrator or underwriter computers and/or communication devices (e.g., PCs and smartphones). Note that communications exchanged via the communication device 1620 may utilize security features, such as those between a public internet user and an internal network of an insurance enterprise. The security features might be associated with, for example, web servers, firewalls, and/or PCI infrastructure. The back-end application computer server 1600 further includes an input device 1640 (e.g., a mouse and/or keyboard to enter information about locations, mobile units, decision making models, etc.) and an output device 1650 (e.g., to output requests, assignments, reports regarding system administration, etc.).

The processor 1610 also communicates with a storage device 1630. The storage device 1630 may comprise any appropriate information storage device, including combinations of magnetic storage devices (e.g., a hard disk drive), optical storage devices, mobile telephones, and/or semiconductor memory devices. The storage device 1630 stores a program 1615 and/or a dispatch tool or application for controlling the processor 1610. The processor 1610 performs instructions of the program 1615, and thereby operates in accordance with any of the embodiments described herein. For example, the processor 1610 may automatically assign locations to mobile units via an automated back-end application computer server. In particular, the processor 1610 might access a location data store containing information about a set of locations to be visited, including location identifiers and location coordinates. The processor 1610 may then prioritize the locations to be visited and establish at least one geo-fence to define a region. A mobile unit data store may contain information about a set of mobile units, including mobile unit identifiers, mobile unit location coordinates, and mobile unit communication address. The processor 1610 may then automatically assign each location to a mobile unit based on the location coordinates, the mobile unit location coordinates, the geo-fence, and said prioritization. Indications of assigned locations may be transmitted to each mobile unit via the associated mobile unit communication address, and electronic messages may be exchanged to support an interactive user interface display associated with assignments of locations to mobile units. According to some embodiments, the processor 1610 facilitates a collection of location data from the assigned mobile units.

The program 1615 may be stored in a compressed, uncompiled and/or encrypted format. The program 1615 may furthermore include other program elements, such as an operating system, a database management system, and/or device drivers used by the processor 1610 to interface with peripheral devices.

As used herein, information may be "received" by or "transmitted" to, for example: (i) the back-end application computer server 1600 from another device; or (ii) a software application or module within the back-end application computer server 1600 from another software application, module, or any other source.

In some embodiments (such as shown in FIG. 16), the storage device 1630 further stores a location database 1700, a mobile unit database 1800, and an assignment database 1900. An example of databases that might be used in connection with the back-end application computer server 1600 will now be described in detail with respect to FIGS. 17 through 19. Note that the databases described herein are only examples, and additional and/or different information may be stored therein. Moreover, various databases might be split or combined in accordance with any of the embodiments described herein. For example, the location database 1700 and/or mobile unit database 1800 might be combined and/or linked to each other within the program 1615.

Figure 17:
FIG. 17 is a portion of a tabular location database in accordance with some embodiments.

Referring to FIG. 17, a table is shown that represents the location database 1700 that may be stored at the back-end application computer server 1600 according to some embodiments. The table may include, for example, entries identifying locations to be visited by mobile units (e.g., in connection with insurance claims). The table may also define fields 1702, 1704, 1706, 1708, 1710, 1712 for each of the entries. The fields 1702, 1704, 1706, 1708, 1710, 1712 may, according to some embodiments, specify: a location identifier 1702, location coordinates 1704, an insurance policy identifier 1706, a claim identifier 1708, a claim status 1710, and an assigned mobile unit 1712. The location database 1700 may be created and updated, for example, based on information electrically received from client devices, call centers, and/or insurance agents.

The location identifier 1702 may be, for example, a unique alphanumeric code identifying an insurance claim that is associated with the location coordinates (e.g., a building address, latitude and longitude values, etc.). The insurance policy number 1706, claim identifier 1708, and claim status 1710 may provide the details about the insurance claim (or contain pointers to electronic records storing details about the insurance claim). The assigned mobile unit 1712 might represent an insurance adjuster who has been assigned to visit the location and might be based on or associated with the mobile unit identifiers 1802 stored in the mobile unit database 1800.

Figure 18:
FIG. 18 is a portion of a tabular mobile unit database in accordance with some embodiments.

Referring to FIG. 18, a table is shown that represents the mobile unit database 1800 that may be stored at the back-end application computer server 1600 according to some embodiments. The table may include, for example, entries identifying mobile units that may visit locations. The table may also define fields 1802, 1804, 1806, 1808, 1810, 1812 for each of the entries. The fields 1802, 1804, 1806, 1808, 1810, 1812 may, according to some embodiments, specify: mobile unit identifier 1802, location coordinates 1804, assigned location identifiers 1806, a communication address 1808, vehicle data 1810, and a current rating 1812. The mobile unit database 1800 may be created and updated, for example, based on information electrically received from a claims adjuster smartphone.

The mobile unit identifier 1802 may be, for example, a unique alphanumeric code identifying a claims adjuster who is currently located at the location coordinates 1804. The assigned locations identifiers 1806 might indicate his or her active work queue and may be based on or associated with the location identifiers 1702 in the location database 1700. The communication address 1808 might indicate how the claims adjuster should receive requests and the vehicle data 1810 might describe his or her vehicle (e.g., to help a client identify the claims adjuster when he or she arrives at the location). The current rating 1812 might comprise, for example, an average satisfaction value representing a number of client reviews (e.g., over the last month).

Figure 19:
FIG. 19 is a portion of a tabular assignment database in accordance with some embodiments.

Referring to FIG. 19, a table is shown that represents the assignment database 1900 that may be stored at the back-end application computer server 1600 according to some embodiments. The table may include, for example, entries identifying insurance claims that have been assigned to claims adjusters. The table may also define fields 1902, 1904, 1906, 1908, 1910, 1912 for each of the entries. The fields 1902, 1904, 1906, 1908, 1910, 1912 may, according to some embodiments, specify: an electronic record identifier 1902, a location identifier 1904, a mobile unit identifier 1906, an estimated time of arrival 1908, a priority 1910, and a status 1912. The supplemental review database 1900 may be created and updated, for example, based on information electrically received from a computer data store, a client, a mobile unit, and/or an administrator.

The electronic record identifier 1902 may be, for example, a unique alphanumeric code identifying an assignment that has been created by the system. The location identifier 1904 might comprise location coordinates of an insurance claim and the mobile unit identifier 1906 might identify a claim adjuster who has been assigned to visit that claim location. The estimated time of arrival 1908 might be a prediction of when the claims adjuster will most likely arrive at the claim location. The priority 1910 might indicate, for example, that the insurance claim is a "high" or "average" priority, a numerical value, etc. and may be used when selecting locations to be assigned. The status 1912 might indicate that the insurance claim associated with the electronic record identifier 1902 is open, assigned, in process, resolved, etc.

Figure 20:
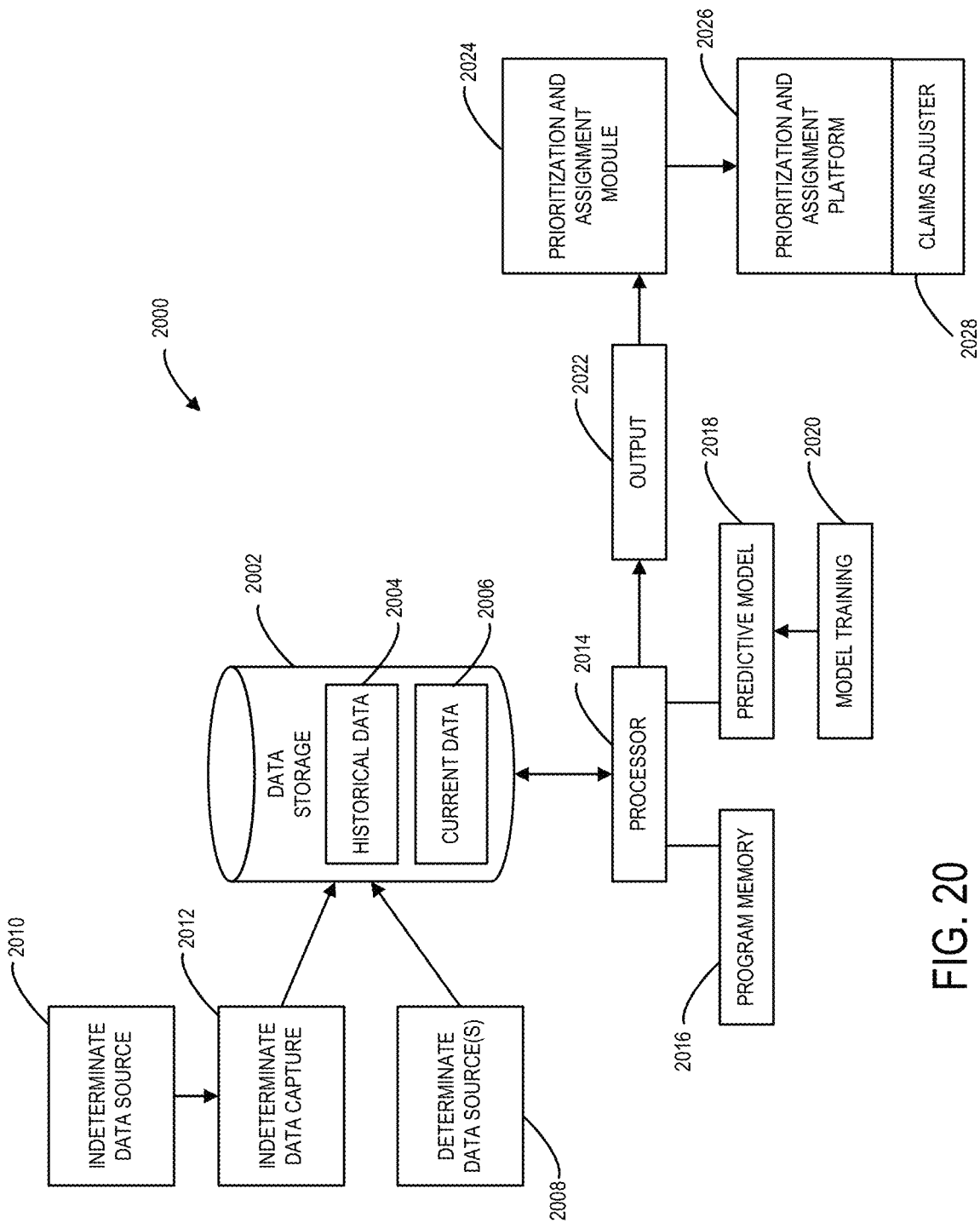
FIG. 20 illustrates a system having a predictive model in accordance with some embodiments.

According to some embodiments, one or more predictive models, business logic, rules, or algorithms (e.g., decision models) may be used to select, create, prioritize, route, and/or evaluate assignments. Features of some embodiments associated with a predictive model will now be described by first referring to FIG. 20. FIG. 20 is a partially functional block diagram that illustrates aspects of a computer system 2000 provided in accordance with some embodiments of the invention. For present purposes it will be assumed that the computer system 2000 is operated by an insurance company (not separately shown) for the purpose of supporting insurance claims adjusting.

The computer system 2000 includes a data storage module 2002. In terms of its hardware the data storage module

2002 may be conventional, and may be composed, for example, by one or more magnetic hard disk drives. A function performed by the data storage module 2002 in the computer system 2000 is to receive, store and provide access to both historical transaction data (reference numeral 2004) and current transaction data (reference numeral 2006). As described in more detail below, the historical transaction data 2004 is employed to train a predictive model to provide an output that indicates an identified performance metric (e.g., whether a claims should be considered high priority) and/or an algorithm to score performance factors, and the current transaction data 2006 is thereafter analyzed by the predictive model. Moreover, as time goes by, and results become known from processing current transactions (e.g., client satisfaction results), at least some of the current transactions may be used to perform further training of the predictive model. Consequently, the predictive model may thereby appropriately adapt itself to changing conditions.

Either the historical transaction data 2004 or the current transaction data 2006 might include, according to some embodiments, determinate and indeterminate data. As used herein and in the appended claims, "determinate data" refers to verifiable facts such as the an age of a business; an automobile type; a policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 2008 that are included in the computer system 2000 and are coupled to the data storage module 2002. The determinate data may include "hard" data like a potential insured's name, date of establishment, industry code, keywords and phrases, policy number, address, an underwriter decision, etc. One possible source of the determinate data may be the insurance company's policy database (not separately indicated).

The indeterminate data may originate from one or more indeterminate data sources 2010, and may be extracted from raw files or the like by one or more indeterminate data capture modules 2012. Both the indeterminate data source(s) 2010 and the indeterminate data capture module(s) 2012 may be included in the computer system 2000 and coupled directly or indirectly to the data storage module 2002. Examples of the indeterminate data source(s) 2010 may include data storage facilities for document images, for text files, and digitized recorded voice files. Examples of the indeterminate data capture module(s) 2012 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 2000 also may include a computer processor 2014. The computer processor 2014 may include one or more conventional microprocessors and may operate to execute programmed instructions to provide functionality as described herein. Among other functions, the computer processor 2014 may store and retrieve historical insurance transaction data 2004 and current transaction data 2006 in and from the data storage module 2002. Thus the computer processor 2014 may be coupled to the data storage module 2002.

The computer system 2000 may further include a program memory 2016 that is coupled to the computer processor 2014. The program memory 2016 may include one or more fixed storage devices, such as one or more hard disk drives, and one or more volatile storage devices, such as RAM devices. The program memory 2016 may be at least partially integrated with the data storage module 2002. The program memory 2016 may store one or more application programs, an operating system, device drivers, etc., all of which may contain program instruction steps for execution by the computer processor 2014.

The computer system 2000 further includes a predictive model component 2018. In certain practical embodiments of the computer system 2000, the predictive model component 2018 may effectively be implemented via the computer processor 2014, one or more application programs stored in the program memory 2016, and computer stored as a result of training operations based on the historical transaction data 2004 (and possibly also data received from a third party). In some embodiments, data arising from model training may be stored in the data storage module 2002, or in a separate computer store (not separately shown). A function of the predictive model component 2018 may be to determine appropriate insurance claim assignments. The predictive model component may be directly or indirectly coupled to the data storage module 2002.

The predictive model component 2018 may operate generally in accordance with conventional principles for mixed effect predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program any type of predictive model, such as a fixed effect or mixed effect predictive model, to operate as described herein.

Still further, the computer system 2000 includes a model training component 2020. The model training component 2020 may be coupled to the computer processor 2014 (directly or indirectly) and may have the function of training the predictive model component 2018 based on the historical transaction data 2004 and/or information about potential insureds. (As will be understood from previous discussion, the model training component 2020 may further train the predictive model component 2018 as further relevant data becomes available.) The model training component 2020 may be embodied at least in part by the computer processor 2014 and one or more application programs stored in the program memory 2016. Thus, the training of the predictive model component 2018 by the model training component 2020 may occur in accordance with program instructions stored in the program memory 2016 and executed by the computer processor 2014.

In addition, the computer system 2000 may include an output device 2022. The output device 2022 may be coupled to the computer processor 2014. A function of the output device 2022 may be to provide an output that is indicative of (as determined by the trained predictive model component 2018) particular performance metrics, automatically flagged electronic records, etc. The output may be generated by the computer processor 2014 in accordance with program instructions stored in the program memory 2016 and executed by the computer processor 2014. More specifically, the output may be generated by the computer processor 2014 in response to applying the data for the current simulation to the trained predictive model component 2018. The output may, for example, be a binary value, a numerical estimate, and/or likelihood within a predetermined range of numbers. In some embodiments, the output device may be implemented by a suitable program or program module executed by the computer processor 2014 in response to operation of the predictive model component 2018.

Still further, the computer system 2000 may include a prioritization and assignment module 2024. The prioritization and assignment module 2024 may be implemented in some embodiments by a software module executed by the computer processor 2014. The prioritization and assignment module 2024 may have the function of rendering a portion of the display on the output device 2022, transmitting requests, and/or routing certain electronic records. Thus, the prioritization and assignment module 2024 may be coupled, at least functionally, to the output device 2022 and/or a workflow router. In some embodiments, for example, the prioritization and assignment module 2024 may report results and/or predictions by routing, to claims adjuster 2028 via prioritization and assignment platform 2026, a location assignment request generated by the predictive model component 2018. In some embodiments, this information may be provided to the claims adjuster 2028 who may also be tasked with determining how to proceed (e.g., by accepting or declining the location request).

Thus, embodiments may provide an automated and efficient way to connect claims adjusters, such as freelance claims adjusters, to insurance claims that have been reported based on their proximity (geo-location) and/or availability to commit. This may let a claims adjuster work for more than one insurance enterprise (and/or work for an insurance enterprise without being a full time employee of the enterprise). For example, a claims adjuster might decide to add himself or herself to a pool of currently available adjusters when convenient (e.g., the adjuster has free time). This pool might then be accessed by one or more insurance enterprises as appropriate to dynamically respond to incoming insurance claims as they occur. This may also effectively reduce the time it takes to service a claim—especially in situations where there is a cluster of claims in a relatively short amount time (and the time to resolve a claim is critical to the safety and security of the client and the preservation of assets). In addition, embodiments may let claims administrators visualize claim locations, thereby providing better insight into the extensiveness of damage resulting from a wide scale event. This information can also be utilized to determine an appropriate level of response. As a result, embodiments described herein may be especially effective in situations where a natural disaster has occurred. Note that some embodiments described herein may further provide savings on travel cost and time and increase customer satisfaction by providing expedient service to policyholders who report claims (e.g., same day service), and facilitate service improvements through customer feedback.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Some embodiments have been described herein in connection with a homeowners' insurance policy (with the location of the insurance claim being the address of the home). Note, however, that embodiments may be associated with other types of insurance, including automobile insurance, business insurance, etc. In the case of automobile insurance, an insurance claim's "location" might change based on where the vehicle is currently parked.

Although specific hardware and data configurations have been described herein, note that any number of other configurations may be provided in accordance with embodiments of the present invention (e.g., some of the information associated with the displays described herein might be implemented as a windshield display or a virtual or augmented reality display and/or any of the embodiments might be implemented using a cloud based computing platform). Moreover, although embodiments have been described with respect to particular types of communication addresses, embodiments may instead be associated with other types of communications (e.g., chat implementations, web-based messaging, etc.). Similarly, although certain types of priority values were described in connection with some embodiments, other types of data might be used instead. Still further, the displays and devices illustrated herein are only provided as examples, and embodiments may be associated with any other types of user interfaces.

Figure 21:
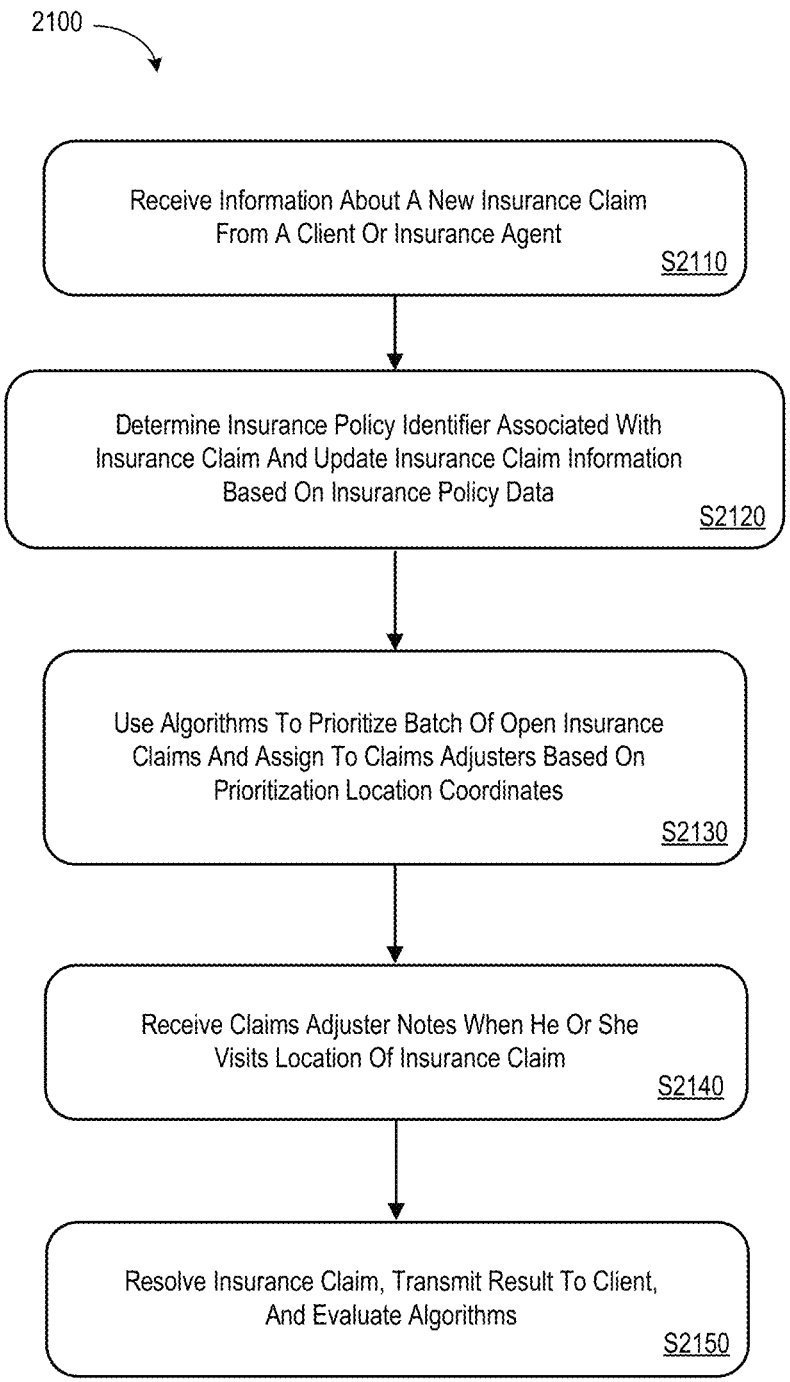
FIG. 21 illustrates an overall insurance enterprise workflow in accordance with some embodiments.

Note that embodiments described herein might be used in connection with a number of different types of business process flows. For example, FIG. 21 illustrates an overall process 2100 in accordance with some embodiments. At S2110, information about a new insurance claim may be received from a client or an insurance agent. The information might include, for example, a location, a type of damage, etc. At S2120, the system may determine an insurance policy identifier associated with the insurance claim and update insurance claim information based on insurance policy data (e.g., describing the types of coverage, deductibles, claim limits, etc.). At S2130, the system may use algorithms, models, business logic and/or rules to prioritize a batch of open insurance claims and assign the claims to claims adjusters based on the prioritization and location coordinates. That is, a claims adjuster might be assigned to an insurance claim that is not the insurance claim at the geographically closest location (because it has a higher priority as compared to the claim at the closest location). At S2140, the system may receive claims adjuster notes when he or she visits the location of the insurance claim. The notes might include a description of an event, pictures showing damage, etc. At S2150, the insurance claim may be resolved, the result may be transmitted to the client (along with payment if appropriate), and the system may evaluate the algorithms (e.g., on a periodic basis to determine if the algorithms may be improved).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to automatically assign locations to mobile units via an automated back-end application computer server, comprising:
   (a) a location data store containing information about a set of locations to be visited, including, for each location to be visited, a location identifier and location coordinates, wherein each location to be visited is associated with an insurance claim submitted by a client of an insurance enterprise;
(b) a mobile unit data store containing information about a set of mobile units, including, for each mobile unit, a mobile unit identifier, mobile unit location coordinates, and a mobile unit communication address, wherein each mobile unit is associated with a claims adjuster;
(c) the back-end application computer server, coupled to the location and mobile unit data stores, including:
a computer processor, and
a computer memory, coupled to the computer processor, storing instructions that, when executed by the computer processor cause the back-end application computer server to:
(i) train a predictive model in a first stage, via a model training component, using historical claim data;
(ii) access the information about the set of locations to be visited,
(iii) prioritize the set of locations to be visited based at least in part on an estimated claim value associated with each location and the trained predictive model,
(iv) access the information about the set of mobile units,
(v) establish at least one geo-fence defining a region,
(vi) automatically assign each location to a mobile unit based at least in part on the location coordinates, the mobile unit location coordinates, the geo-fence, and said prioritization, wherein said assignment includes transmitting a first assignment request to a first mobile unit without transmitting the first assignment request to a second mobile unit thereby reducing a number of electronic messages that are transmitted via a distributed communication network and, if the first mobile unit accepts the first request, assigning the location to be visited to the first mobile unit, and further wherein, if the first mobile unit does not accept the first request, transmitting a second assignment request to the second mobile unit,
(vii) calculate an estimated time of mobile unit arrival for each location to be visited,
(viii) transmit indications of assigned locations to be visited to each mobile unit via the associated mobile unit communication address,
(ix) receive, from each client, rating information about the assigned claims adjuster, and
(x) receive, from each claims adjuster, insurance claim information including at least one of: weather information, a temperature, a noise level, a wind speed, a barometric pressure, environmental quality information, air quality, and water contamination data wherein the insurance claim information is fed back to further train and improve the predictive model;
(xi) train the predictive model, via the model training component in a second stage based on the received rating information from each client and the received insurance claim information from each claims adjuster; and
(d) a communication port coupled to the back-end application computer server to facilitate an exchange of electronic messages, via the distributed communication network, supporting at least one interactive user interface display associated with assignments of locations to mobile units, wherein the back-end application computer server facilitates a collection of location data from the assigned mobile units, wherein the interactive user interface display is associated with the client who submitted the insurance claim and includes a map containing information about the claims adjuster assigned to the insurance claim, and selection of an icon associated with the claims adjuster results in a display of detailed information about that claims adjuster including the calculated estimated time of mobile unit arrival.

2. The system of claim 1, wherein the communication address is associated with at least one of: (i) a mobile telephone number, (ii) a vehicle identifier, (iii) a user identifier, (iv) an Internet Protocol address, and (v) a device identifier associated with a push message registration.

3. The system of claim 1, wherein at least one of the location coordinates and the mobile unit location coordinates are associated with at least one of: (i) a postal address, (ii) a ZIP code, (iii) Global Positioning System information, (iv) latitude and longitude values, and (v) mobile telephone location data.

4. The system of claim 1, wherein a geo-fence is associated with at least one of: (i) a location to be visited, (ii) a population density, (iii) a location density, (iv) a mobile unit density, and (v) priority information.

5. The system of claim 1, wherein at least one geo-fence region is calculated using at least one of: (i) distance information, (ii) time information, (iii) traffic information, (iv) weather information, (v) speed limit information, and (vi) jurisdiction information.

6. The system of claim 1, wherein said prioritization is further based on at least one of: (i) an average claim value for a given area, (ii) a claim value weighting, (iii) an average damage weighting, (iv) a damage weighting, (v) a damage value weighting, (vi) an average claim open time, (vii) a time claim open, and (viii) a time open weighting.

7. The system of claim 1, wherein the interactive user interface display is associated with the claim adjuster and includes a map containing information about a plurality of insurance claims, wherein selection of an icon associated with a particular insurance claim results in a display of detailed information about that particular insurance claim.

8. The system of claim 1, wherein the interactive user interface display is associated with the insurance enterprise and includes a map containing information about a plurality of claims adjusters, wherein selection of an icon associated with a particular claims adjuster results in a display of detailed information about that particular claims adjuster.

9. The system of claim 1, wherein information about insurance claims is dynamically collected via at least one of: (i) an email received by an email server, (ii) information provided a web interface, (iii) an interactive voice response system associated with a telephone call center, (iv) a chat application that interacts with a party in substantially real time, and (v) a video link.

10. The system of claim 9, wherein, after insurance claims are resolved, the back-end application computer server is further to periodically monitor performance outcomes and automatically adjust a prioritization algorithm.

11. The system of claim 1, wherein each insurance claim is associated with an event, and further wherein the back-end application server access pre-event insurance policy information, transmits the pre-event insurance policy insurance information to the assigned mobile unit, and receives, from the assigned mobile unit, post-event location data representing damage caused by the event.

12. The system of claim 1, wherein at least one mobile unit is associated with: (i) a smartphone, (ii) a mobile computer, (iii) a table computer, (iv) an on-board vehicle diagnosis plug-in device, (v) a built-in dashboard display, (vi) a flying drone, (vii) a self-driving vehicle, (viii) a smart watch, (ix) a pair of smart eyeglasses, (x) an augmented reality device, (xi) an Internet of Things ("IoT") device, (xii) a health monitoring device, and (xiii) a network-connected device able to approximate and report a current location.

13. A computerized method to automatically assign locations to mobile units via an automated back-end application computer server, comprising:

training a predictive model in a first stage, via a model training component, using historical claim data;

accessing a location data store containing information about a set of locations to be visited, including, for each location to be visited, a location identifier and location coordinates, wherein each location to be visited is associated with an insurance claim submitted by a client of an insurance enterprise;

prioritizing, by the back-end application computer server, the set of locations to be visited based at least in part on an estimated claim value associated with each location and the trained predictive model;

accessing a mobile unit data store containing information about a set of mobile units, including, for each mobile unit, a mobile unit identifier, mobile unit location coordinates, and mobile unit communication address, wherein each mobile unit is associated with a claims adjuster;

establishing at least one geo-fence defining a region;

automatically assigning, by the back-end application computer server, each location to a mobile unit based at least in part on the location coordinates, the mobile unit location coordinates, the geo-fence, and said prioritization, wherein said assignment includes transmitting a first assignment request to a first mobile unit without transmitting the first assignment request to a second mobile unit thereby reducing a number of electronic messages that are transmitted via a distributed communication network and, if the first mobile unit accepts the first request, assigning the location to be visited to the first mobile unit, and further wherein, if the first mobile unit does not accept the first request, transmitting a second assignment request to the second mobile unit;

calculating an estimated time of mobile unit arrival for each location to be visited;

transmitting indications of assigned locations to be visited to each mobile unit via the associated mobile unit communication address;

exchanging electronic messages, via the distributed communication network, to support at least one interactive user interface display associated with assignments of locations to mobile units, wherein the interactive user interface display is associated with the client who submitted the insurance claim and includes a map containing information about the claims adjuster assigned to the insurance claim, and selection of an icon associated with the claims adjuster results in a display of detailed information about that claims adjuster including the calculated estimated time of mobile unit arrival;

facilitating, by the back-end application computer server, a collection of location data from the assigned mobile units;

receiving, from each client, rating information about the assigned claims adjuster;

receiving, from each claims adjuster, insurance claim information including at least one of: weather information, a temperature, a noise level, a wind speed, a barometric pressure, environmental quality information, air quality, and water contamination data wherein the insurance claim information is fed back to further train and improve the predictive model; and training the predictive model, via the model training component in a second stage, based on the received rating information from each client and the received insurance claim information from each claims adjuster.

* * * * *